(12) United States Patent
Miyamoto et al.

(10) Patent No.: US 11,899,117 B2
(45) Date of Patent: Feb. 13, 2024

(54) MOVING BODY POSITIONING SYSTEM, METHOD, AND PROGRAM

(71) Applicant: NEC Solution Innovators, Ltd., Tokyo (JP)

(72) Inventors: Ryo Miyamoto, Tokyo (JP); Maho Kashiwagi, Tokyo (JP); Yuka Kanda, Tokyo (JP)

(73) Assignee: NEC Solution Innovators, Ltd., Tokyo (JP)

( * ) Notice: Subject to any disclaimer, the term of this patent is extended or adjusted under 35 U.S.C. 154(b) by 789 days.

(21) Appl. No.: 16/971,613

(22) PCT Filed: Sep. 13, 2018

(86) PCT No.: PCT/JP2018/033986
§ 371 (c)(1),
(2) Date: Aug. 20, 2020

(87) PCT Pub. No.: WO2019/171633
PCT Pub. Date: Sep. 12, 2019

(65) Prior Publication Data
US 2021/0011171 A1    Jan. 14, 2021

(30) Foreign Application Priority Data

Mar. 9, 2018 (JP) ................................. 2018-042682

(51) Int. Cl.
*G01S 19/22* (2010.01)
*G01C 21/28* (2006.01)
*G01S 19/28* (2010.01)

(52) U.S. Cl.
CPC .............. *G01S 19/22* (2013.01); *G01C 21/28* (2013.01); *G01S 19/28* (2013.01)

(58) Field of Classification Search
CPC .......... G01S 19/22; G01S 19/28; G01C 21/28
(Continued)

(56) References Cited

U.S. PATENT DOCUMENTS

2003/0055562 A1* 3/2003 Levy ...................... G01C 21/28
701/409
2008/0166011 A1    7/2008 Sever et al.

FOREIGN PATENT DOCUMENTS

CN      101772710 A    7/2010
CN      102216802 A    10/2011
(Continued)

OTHER PUBLICATIONS

CN Office Action for CN Application No. 201880090465.7, dated Mar. 1, 2023 with English Translation.
(Continued)

*Primary Examiner* — Farhana A Hoque

(57) ABSTRACT

A moving body positioning system of the present invention includes: a GNSS receiver that is included in a moving body and that receives a GNSS signal transmitted from each of one or more satellites and acquires pieces of observation data respectively corresponding to the satellites; an external data acquisition means that acquires external data; a multipath detection means that detects multipath with respect to an observation data group; and a positioning calculation means that performs positioning calculation after a selection of a satellite to be used and a satellite to be excluded on the basis of a result of the multipath detection.

10 Claims, 19 Drawing Sheets

(58) Field of Classification Search
USPC .................................................. 324/352 ALL
See application file for complete search history.

(56) References Cited

FOREIGN PATENT DOCUMENTS

| | | |
|---|---|---|
| CN | 102782523 A | 11/2012 |
| CN | 103176192 A | 6/2013 |
| JP | H08-240654 A | 9/1996 |
| JP | 2000-180191 A | 6/2000 |
| JP | 2007-093483 A | 4/2007 |
| JP | 2008-026143 A | 2/2008 |
| JP | 2008-051572 A | 3/2008 |
| JP | 2010-534849 A | 11/2010 |
| JP | 2012-052905 A | 3/2012 |
| JP | 2012-159347 A | 8/2012 |
| JP | 2017-009429 A | 1/2017 |

OTHER PUBLICATIONS

Japanese Office Action for JP Application No. 2020-504656 dated Mar. 15, 2022 with English Translation.
International Search Report dated Dec. 11, 2018, in corresponding PCT International Application.

* cited by examiner

FIG. 9

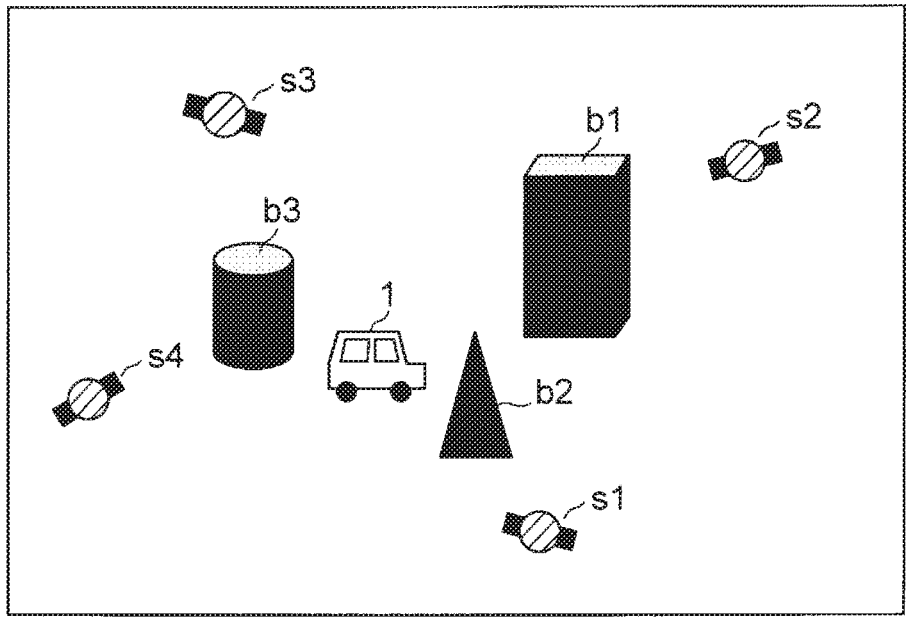

FIG. 10

| RECEPTION SATELLITE | AZIMUTH ANGLE θ | ELEVATION ANGLE φ |
|---|---|---|
| s1 | 185 | 30 |
| s2 | 46 | 40 |
| s3 | 300 | 47 |
| s4 | 220 | 35 |

(a)

| BLOCKING OBJECT | AZIMUTH ANGLE θ | ELEVATION ANGLE φ |
|---|---|---|
| b1 | 45-80 | 0-80 |
| b2 | 180-190 | 0-65 |
| b3 | 270-320 | 0-50 |

(b)

| RECEPTION SATELLITE | NOTE (θ', φ': DEGREE OF OVERLAP) | EXISTENCE/ NON-EXISTENCE OF MULTIPATH | EXCLUSION PRIORITY |
|---|---|---|---|
| s1 | AZIMUTH ANGLE NG, ELEVATION ANGLE NG (θ'=5°, φ'=30°) | EXIST | 1 |
| s2 | AZIMUTH ANGLE NG, ELEVATION ANGLE NG (θ'=1°, φ'=40°) | EXIST | 3 |
| s3 | AZIMUTH ANGLE NG, ELEVATION ANGLE NG (θ'=20°, φ'=3°) | EXIST | 2 |
| s4 | AZIMUTH ANGLE OK, ELEVATION ANGLE NG (θ'=-30°, φ'=30°) | NOT EXIST | 4 |

(c)

FIG. 16
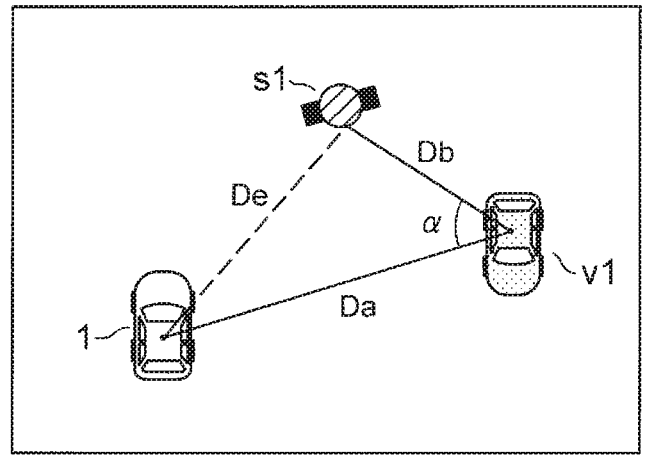
(a)
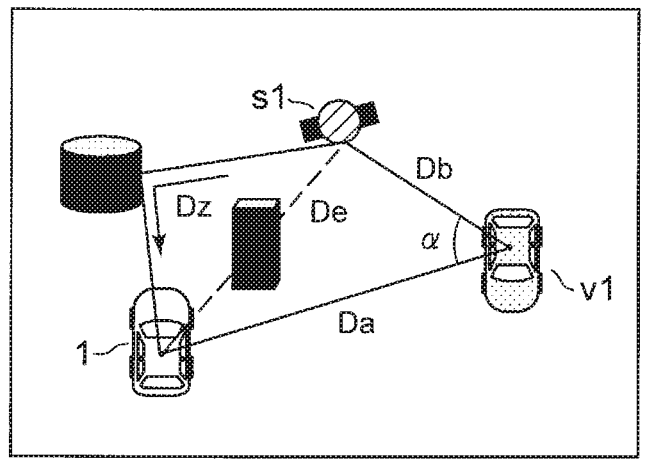
(b)
FIG. 17
| RECEPTION SATELLITE | PSEUDO DISTANCE DIFFERENCE [m] | EXISTENCE/NON-EXISTENCE OF MULTIPATH | EXCLUSION PRIORITY |
|---|---|---|---|
| s1 | 5 | NOT EXIST | 4 |
| s2 | 30 | EXIST | 1 |
| s3 | 14 | EXIST | 2 |
| s4 | 17 | EXIST | 3 |

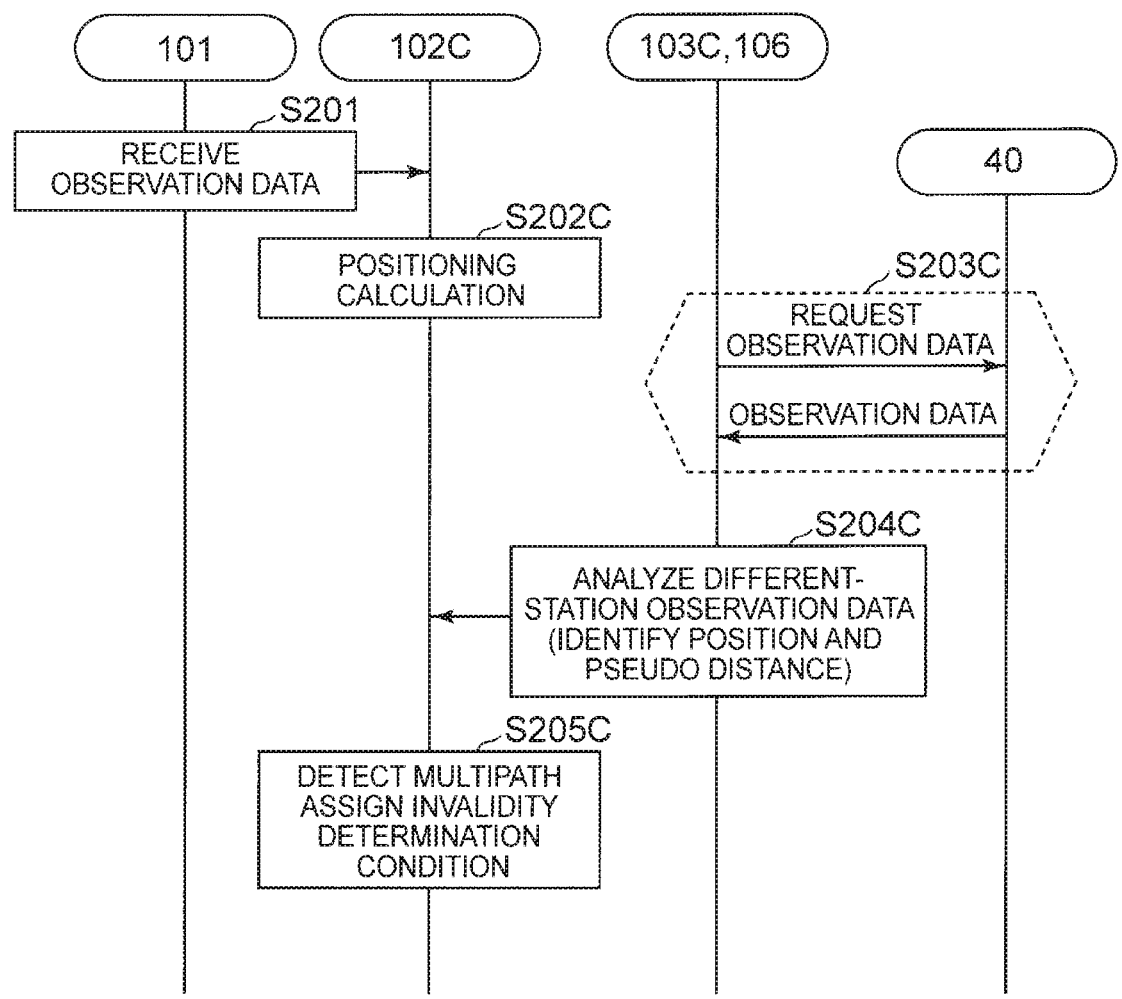

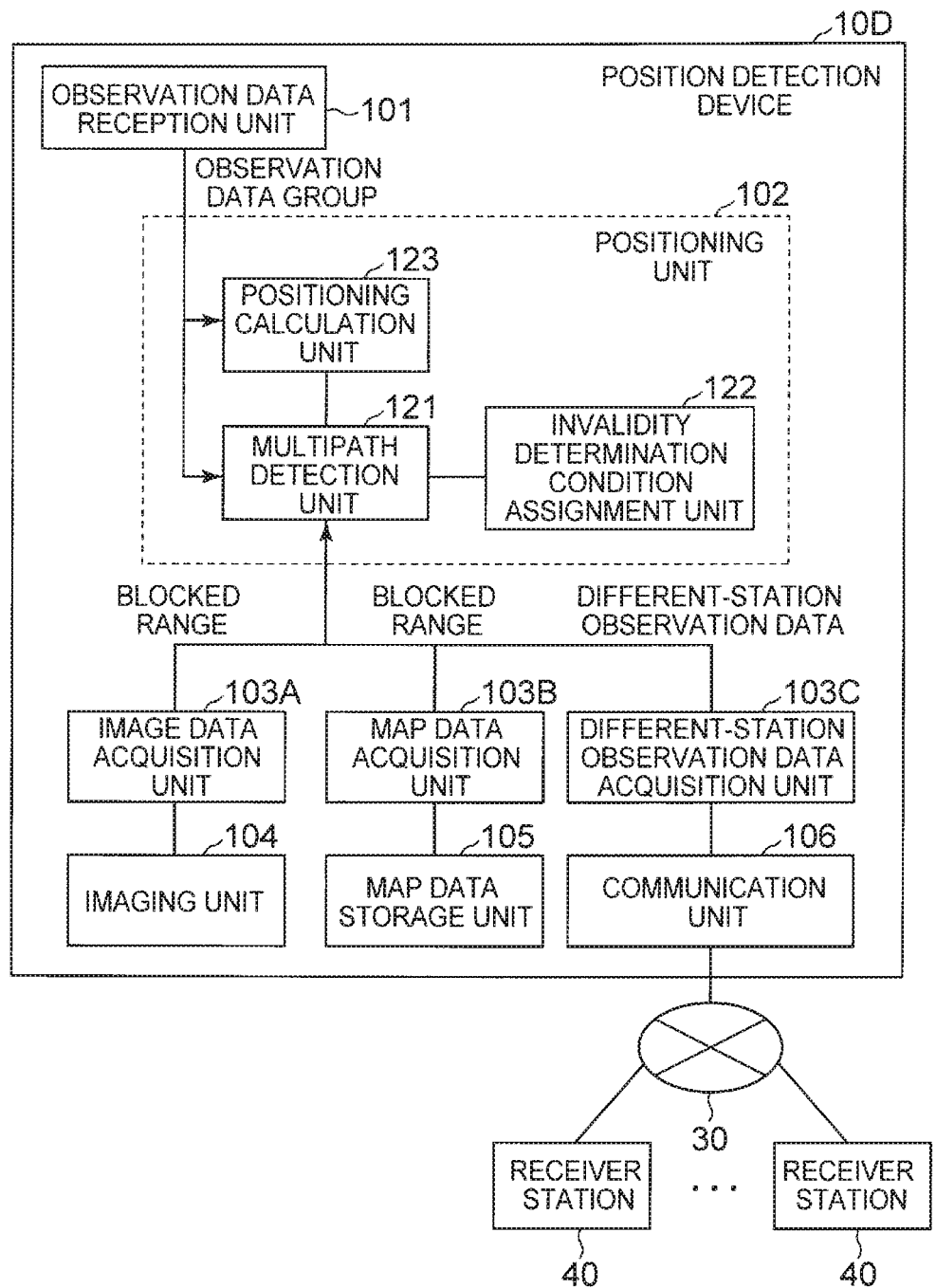

FIG. 20

| RECEPTION SATELLITE | AZIMUTH ANGLE θ | ELEVATION ANGLE φ |
|---|---|---|
| s1 | 185 | 38 |
| s2 | 43 | 85 |
| s3 | 300 | 67 |
| s4 | 277 | 65 |

(a)

| BLOCKING OBJECT | AZIMUTH ANGLE θ ($\theta_{min}, \theta_{max}$) | ELEVATION ANGLE φ ($\phi_{min}, \phi_{max}$) |
|---|---|---|
| b1 | 180,190 | 0,65 |
| b2 | 45,80 | 0,50 |
| b3 | 270,320 | 0,70 |

(b)

| RECEPTION SATELLITE | PSEUDO DISTANCE DIFFERENCE [m] |
|---|---|
| s1 | 65 |
| s2 | 5 |
| s3 | 35 |
| s4 | 20 |

(c)

| RECEPTION SATELLITE | AZIMUTH ANGLE SCORE | ELEVATION ANGLE SCORE | PSEUDO DISTANCE SCORE |
|---|---|---|---|
| s1 | 5 | 10 | 10 |
| s2 | 0 | 0 | 1 |
| s3 | 10 | 0 | 7 |
| s4 | 7 | 5 | 4 |

(d)

| RECEPTION SATELLITE | BLOCKED DEGREE (IMAGE) AZIMUTH ANGLE | BLOCKED DEGREE (IMAGE) ELEVATION ANGLE | BLOCKED DEGREE (MAP) AZIMUTH ANGLE | BLOCKED DEGREE (MAP) ELEVATION ANGLE | PSEUDO DISTANCE DIFFERENCE [m] | EXISTENCE/ NON-EXISTENCE OF MULTIPATH | INVALIDITY DETERMINATION SCORE | EXCLUSION PRIORITY |
|---|---|---|---|---|---|---|---|---|
| s1 | 5° | 27° | — | — | 65 | EXIST | 25 | 1 |
| s2 | — | — | NONE | NONE | 5 | NOT EXIST | 1 | 4 |
| s3 | 20° | 3° | 14° | 2° | 35 | EXIST | 17 | 2 |
| s4 | — | — | 7° | 5° | 20 | EXIST | 16 | 3 |

(e)

MOVING BODY POSITIONING SYSTEM, METHOD, AND PROGRAM

CROSS-REFERENCE TO RELATED PATENT APPLICATIONS

This application is a National Stage Entry of International Application No. PCT/JP2018/033986, filed Sep. 13, 2018, which claims priority from Japanese Patent Application No. 2018-042682, filed Mar. 9, 2018. The entire contents of the above-referenced applications are expressly incorporated herein by reference.

TECHNICAL FIELD

The present invention relates to a satellite positioning field, and more specifically relates to a moving body positioning system, a moving body positioning method, a moving body positioning program, and a moving body positioning program that detect a current position of a moving body by using a satellite positioning system.

BACKGROUND ART

In satellite positioning, there are various error factors such as a satellite orbit error, satellite clock error, ionospheric variation, tropospheric fluctuation, signal interruption, and multipath, and it is very difficult to constantly realize stable and highly accurate satellite positioning in any environment.

For example, not only in an environment in which a satellite is completely blocked but also in an environment such as an urban area with high-rise buildings or a mountain area placed between mountains, accuracy of satellite positioning is likely to be deteriorated due to signal interruption or multipath among the above error factors. Specifically, the multipath is a major deterioration factor of satellite positioning accuracy.

Note that an influence of a positioning environment such as the multipath not only appears, for example, as a deviation (error) between a satellite positioning position before fixation (Float value) and a satellite positioning position after fixation (Fix value) but also appears as a deviation (error) from a correct position in a Fix state.

For example, there are technologies described in PTL 1 and 2 with respect to technologies of improving accuracy of sanitary positioning in consideration of multipath. For example, in PTL 1, a technology of detecting multipath by estimating an own device position from a moving distance and an angular displacement amount, calculating a distance to a position of a reception satellite on the basis of the estimated own device position, and comparing the calculated distance with signal propagation time of a reception signal received by a satellite positioning system (global navigation satellite system: GNSS) (hereinafter, referred to as GNSS signal) is described. Also, as a more detailed method in that case, it is described in PTL 1 to detect obstacle reflection of a satellite by acquiring heights of surrounding buildings acquired from a map database, calculating an azimuth and an elevation angle of a reception satellite, and performing comparison thereof.

Also, in PTL 2, it is described that multipath determination is performed on the basis of whether a result of horizontal projection of a difference between a distance, which is between a current position acquired from a positioning system and a transmitter station, and a propagation distance of a reception signal onto map data is in a range of a multipath determination region calculated from a traveling direction, which is indicated by a velocity vector calculated from an autonomous sensor, and the current position acquired from the positioning system.

CITATION LIST

Patent Literature

PTL 1: Japanese Patent Application Laid-Open No. 2000-180191

PTL 2: Japanese Patent Application Laid-Open No. 2008-051572

SUMMARY OF INVENTION

Technical Problem

However, in the methods described in PTL 1 and 2, a current position of a moving body is necessary in order to detect multipath that is an error factor to deteriorate accuracy of a positioning result (current position) of a positioning system used to acquire the current position. Note that the method described in PTL 1 requires an own device position estimated from a moving distance and an angular displacement amount, and the method described in PTL 2 requires a current position that is a positioning result of the positioning system. Since none of these current positions are acquired with high accuracy, there is a problem that determination accuracy becomes low in a case where multipath determination is made by simple utilization of such current positions with low accuracy. Also, in a case where map data is used, the map data may be old.

Also, in PTL 1 and 2, as utilization examples of a multipath determination result, performing positioning while excluding a satellite that is a transmission source of a reception signal in a case where multipath (obstacle reflection) is determined, and not performing an own device position correction according to a positioning result using the reception signal are disclosed. However, in a case where such simple exclusion is performed, there is a possibility that availability is not secured. For example, there is a case where it is preferable to make use without exclusion depending on the number of satellites that the mobile device can receive. In such a case, for example, with which priority satellites reception signals of which are used are selected is an important point. However, in the methods described in PTL 1 and 2, consideration on not only this point but also how to use a result of multipath determination is not sufficient.

Thus, the present invention is to provide a moving body positioning system capable of improving positioning accuracy while securing availability of the system as much as possible even for a moving body that cannot always acquire highly accurate positional information or the latest map data, and a multipath detection device, method, and program used therein.

Solution to Problem

A moving body positioning system according to the present invention includes: a GNSS receiver that is included in a moving body and that receives a GNSS signal transmitted from each of one or more satellites and acquires observation data corresponding to each of the satellites; an external data acquisition means that acquires external data that is predetermined data other than the observation data; a multipath detection means that detects multipath with respect to an observation data group that is a set of pieces of observation data used for positioning calculation to identify a position of the moving body and that is a set of pieces of observation data respectively acquired from the GNSS signals of the one or more satellites; and a positioning calculation means that performs positioning calculation after selection of a satellite to be used and a satellite to be excluded on the basis of a result of the multipath detection, wherein the multipath detection means detects multipath by determining whether the observation data is multipath on the basis of a blocked range with respect to the GNSS signals in the moving body or an observation status of the GNSS signals in a different station that is a receiver station other than the moving body, the blocked range or the observation status being acquired from an analysis of the external data.

A multipath detection device according to the present invention includes: an external data acquisition means that acquires external data that is predetermined data other than observation data acquired from a GNSS signal received by a GNSS receiver included in a moving body; and a multipath detection means that detects multipath by determining whether the observation data is multipath on the basis of a blocked range with respect to the GNSS signal in the moving body or an observation status of the GNSS signal in a different station that is a receiver station other than the moving body, the blocked range or the observation status being acquired by an analysis of the external data.

A moving body positioning method according to the present invention includes: acquiring observation data that is acquired from a GNSS signal transmitted from each of one or more satellites and received by a GNSS receiver included in a moving body and that is observation data corresponding to each of the satellites; acquiring external data that is predetermined data other than the observation data; detecting multipath, with respect to an observation data group that is a set of pieces of the observation data respectively corresponding to the satellites, by determining whether each piece of the observation data in the observation data group is multipath on the basis of a blocked range with respect to the GNSS signals in the moving body or an observation status of the GNSS signals in a different station that is a receiver station other than the moving body, the blocked range or the observation status being acquired by an analysis of the external data; and performing positioning calculation after selection of a satellite to be used or a satellite to be excluded on the basis of a result of the multipath detection, acquiring observation data, acquiring external data, detecting multipath, and performing position calculation being performed by an information processing device.

A multipath determination method according to the present invention includes: acquiring external data that is predetermined data other than observation data acquired from a GNSS signal received by a GNSS receiver included in a moving body; and detecting multipath by determining whether the observation data is multipath on the basis of a blocked range with respect to the GNSS signal in the moving body or an observation status of the GNSS signal in a different station that is a receiver station other than the moving body, the blocked range or the observation status being acquired by an analysis of the external data, acquiring external data and detecting multipath being performed by an information processing device.

A moving body positioning program according to the present invention causes a computer to execute processing of acquiring observation data that is acquired from a GNSS signal transmitted from each of one or more satellites and received by a GNSS receiver included in a moving body and that is observation data corresponding to each of the satellites, processing of acquiring external data that is predetermined data other than the observation data, processing of detecting multipath, with respect to an observation data group that is a set of pieces of the observation data respectively corresponding to the satellites, by determining whether each piece of the observation data in the observation data group is multipath on the basis of a blocked range with respect to the GNSS signals in the moving body or an observation status of the GNSS signals in a different station that is a receiver station other than the moving body, the blocked range or the observation status being acquired by an analysis of the external data, and processing of performing positioning calculation after selection of a satellite to be used and a satellite to be excluded on the basis of a result of the multipath detection.

A multipath determination program according to the present invention causes a computer to execute processing of acquiring external data that is predetermined data other than observation data acquired from a GNSS signal received by a GNSS receiver included in a moving body, and processing of determining whether the observation data is multipath on the basis of a blocked range with respect to the GNSS signal in the moving body or an observation status of the GNSS signal in a different station that is a receiver station other than the moving body, the blocked range or the observation status being acquired by an analysis of the external data.

Advantageous Effects of Invention

According to the present invention, even from observation data observed by a moving body that cannot always acquire highly accurate positional information or the latest map data, an own device position of the moving body can be detected highly accurately. Also, according to the present invention, even in a case of the moving body, it is possible to improve positioning accuracy while securing availability of a satellite positioning system as much as possible.

BRIEF DESCRIPTION OF DRAWINGS

FIG. 9 It depicts a view for describing an example of observation data and surrounding environment grasping in a moving body.

FIG. 10 It depicts a view for describing an example of multipath detection based on the surrounding environment grasping.

FIG. 16 It depicts a view for describing an example of a multipath detection method.

FIG. 17 It depicts a view for describing an example of a multipath detection result and exclusion priority based on a pseudo distance difference.

FIG. 18 It depicts a sequence diagram illustrating an operation example of the position detection device of the third exemplary embodiment.

FIG. 19 It depicts a block diagram illustrating a configuration example of a position detection device of a fourth exemplary embodiment.

FIG. 20 It depicts a view for describing an example of a result of exclusion priority assignment.

DESCRIPTION OF EMBODIMENTS

In the following, exemplary embodiments of the present invention will be described with reference to the drawings. First, a technological concept of the present invention will be briefly described.

In the present invention, in detection of a current position of a moving body by satellite positioning, multipath is detected by utilization of any of (1) surrounding environment grasping using image data acquired by photographing of a surrounding environment with a camera device mounted on the moving body, (2) surrounding environment grasping using three-dimensional map information such as a dynamic map, and (3) sharing of positioning analysis data by communication with a different receiver station (regardless whether a moving object or not) of a satellite positioning system, or a combination thereof. However, it is more preferable that (2) is used in combination with at least (1) or (3) instead of being used alone.

In any of the methods, determination of multipath is performed by utilization of external data. The external data is data other than observation data (own-station observation data) acquired from a GLASS signal received by a receiver station (moving body, in the present invention) in a satellite positioning system, a current position of which station is to be detected, from each satellite that is a transmitter station in the satellite positioning system. For example, the external data is image data, three-dimensional map data, or positioning analysis data in a different receiver station in the satellite positioning system.

Also, in the present invention, in addition to detection of multipath, availability of a reception satellite, priority in exclusion of a reception satellite, or the like is determined on the basis of, for example, a blocked degree of a received GNSS signal which degree is identified as a result of surrounding environment grasping, or an amount of error in a pseudo distance to a reception satellite that is a satellite from which the GNSS signal is received, the amount being identified as a result of data sharing. A result of the determination is output along with a result of the multipath detection. Here, the pseudo distance to the reception satellite is a distance between a transmitter station (satellite) and a receiver station (moving body) which distance is indicated by propagation time of a reception signal that is the received GNSS signal. In the following, the distance is referred to as a "pseudo distance" for the purpose of a distinction from an actual distance. Also, an error in the pseudo distance is a difference between the pseudo distance and the actual distance.

Figure 1:
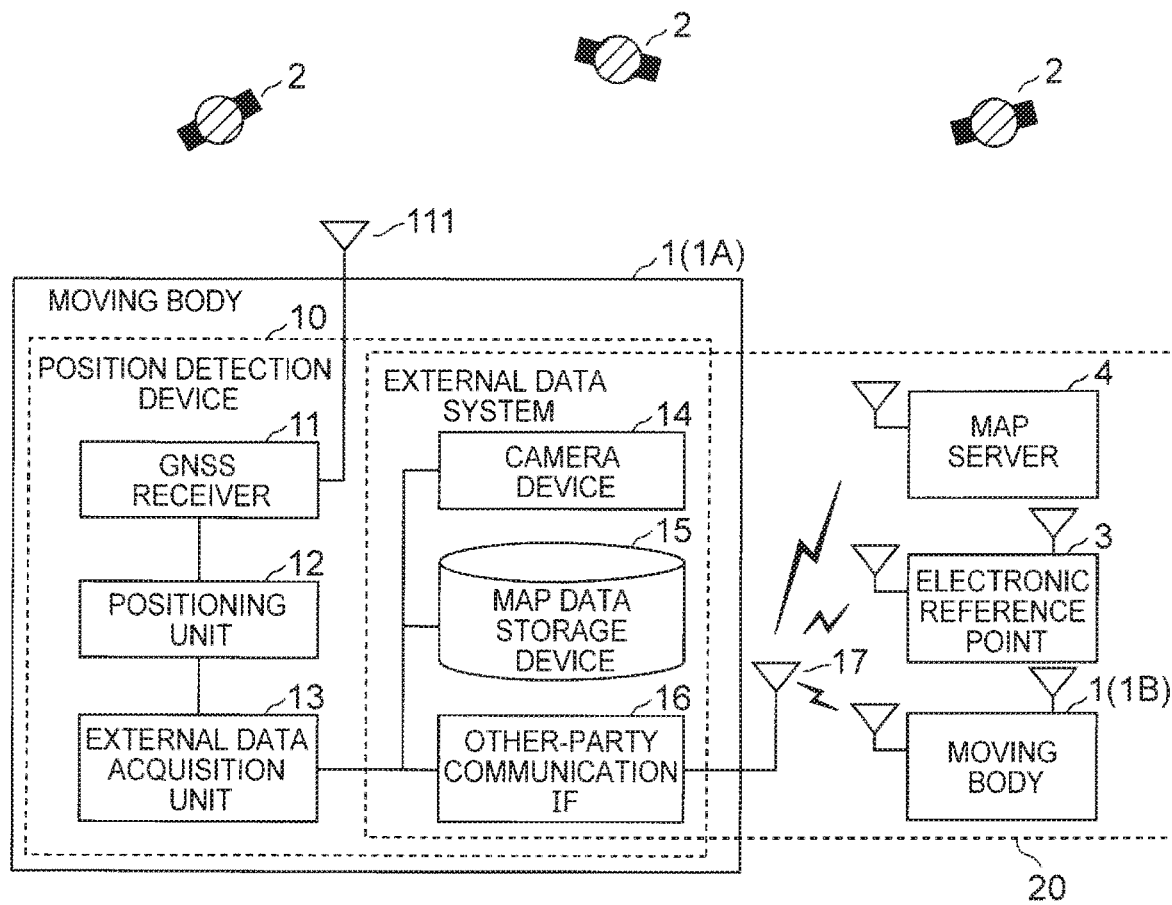
FIG. 1 It depicts a schematic configuration diagram of a moving body positioning system according to the present invention.

FIG. 1 is a schematic configuration diagram of a moving body positioning system according to the present invention. The moving body positioning system illustrated in FIG. 1 includes at least one or more satellites 2 and a moving body 1. Note that the moving body positioning system may further include a different moving body 1, an electronic reference point 3, and a map server 4.

In the present example, the moving body 1 includes a GNSS receiver 11, a GNSS antenna 111, a positioning unit 12, an external data acquisition unit 13, a camera device 14, a map data storage device 15, and an other-party communication interface (IF) 16, and an other-party communication antenna 17.

In the present example, the camera device 14, the map data storage device 15, the other-party communication IF 16, and the other-party communication antenna 17 are at least a part of an external data system 20 (moving body-side function).

The GNSS receiver 11 may be a receiver in a general satellite positioning system. That is, GNSS signals from one or a plurality of satellites 2 are received and observation data acquired from the received GNSS signals is output.

The positioning unit 12 performs positioning calculation on the basis of the observation data from each reception satellite which data is output from the GNSS receiver 11, and positions (calculate) a current position of the own device (moving body 1 including the GNSS receiver 11). The positioning unit 12 of the present exemplary embodiment has, in addition to a general positioning calculation function, functions of performing multipath detection based on an analysis result of external data output from an external data acquisition unit 13 (described later), and performing selection of a reception satellite used in positioning calculation (satellite to be used) or positioning calculation based on reliability of each piece of observation data on the basis of a detection result of the multipath.

The external data acquisition unit 13 acquires external data from the external data system 20, analyzes the acquired external data, and outputs a predetermined analysis result. Here, for example, the external data acquisition unit 13 may acquire and analyze image data or map data as the external data, and output a blocked range due to each blocking object seen from the own device (blocked range of the GNSS signal). Also, for example, the external data acquisition unit 13 may acquire and analyze, as the external data, observation data acquired by a different receiver station (hereinafter, referred to as different-station observation data), and output an observation status of a GNSS signal in the different receiver station or output a pseudo distance difference for a reception satellite.

The external data system 20 is a system for the moving body 1 (1A), a current position of which is to be detected, to hold or acquire predetermined external data. The external data system 20 may include a camera device 14, a map data storage device 15, an other-party communication IF 16, a moving body 1 (1B) as a different receiver station, an electronic reference point 3, and a map server 4. Note that as already described, the external data is data other than own-station observation data that is observation data from a reception satellite and that is acquired in a GNSS receiver 11 (own station) included in the own device (moving body 14). Note that a reference sign 17 in the drawing is an other-party communication antenna Note that the external data system 20 is roughly divided into a moving body-side function and an external function. Among the above, the camera device 14, the map data storage device 15, and the other-party communication IF 16 belong to the moving body-side function, and the other receiver stations (moving body 1B and electronic reference point 3) and the map server 4 belong to the external function. Note that the moving body-side function only needs to include at least one of the above. Note that a function to be included can be selected as the external function according to the moving body-side function. As an example, in a case where the moving body-side function includes the map data storage device 15, the external function preferably includes the map server 4. Also, for example, in a case where the moving body-side function includes the other-party communication IF 16, the external function preferably includes at least one different receiver station. Note that although a kind of the different receiver station is not specifically limited, it is more preferable that a plurality of different receiver stations is included. Note that the external function may be omitted depending on the moving body-side function.

In the following, the moving body-side functions of the GNSS receiver 11, the positioning unit 12, the external data acquisition unit 13, and the external data system 20 may be referred to as a "position detection device 10". Note that the position detection device 10 may include a GNSS antenna 111. For example, as a device that detects a current position of the own device by using a satellite positioning system, the position detection device 10 is provided in a moving body 1 such as a vehicle.

Also, in FIG. 1, the GNSS receiver 11 and the positioning unit 12 are illustrated as separate devices in the moving body 1. However, for example, by installation of a function of the positioning unit 12 to the GNSS receiver 11, these may be mounted as one device.

Figure 2:
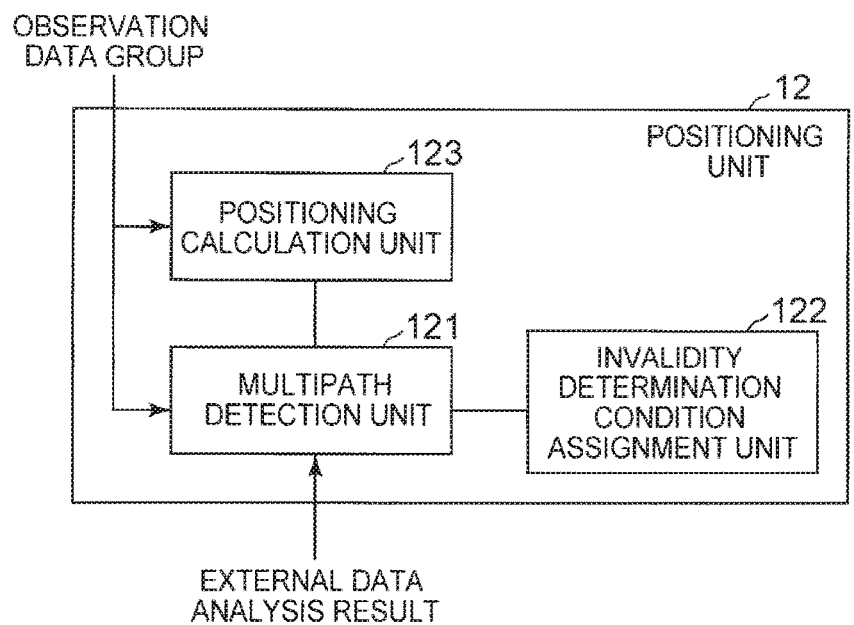
FIG. 2 It depicts a block diagram illustrating a configuration example of a positioning unit 12.

Also, FIG. 2 is a block diagram illustrating a configuration example of the positioning unit 12. As illustrated in FIG. 2, the positioning unit 12 may include a multipath detection unit 121, an invalidity determination condition assignment unit 122, and a positioning calculation unit 123.

On the basis of an analysis result of the external data acquisition unit 13 (hereinafter, referred to as external data analysis result), the multipath detection unit 121 performs detection of multipath with respect to each of pieces of observation data included in an observation data group received by the GNSS receiver 11. For observation data from each reception satellite, the multipath detection unit 121 detects multipath by determining whether the observation data is received by multipath on the basis of the observation data and the external data analysis result. Here, "determining whether the observation data is received by multipath" means to determine whether a reception signal from which the observation data is acquired is a multipath signal, and more specifically, whether obstacle reflection is included in a propagation path of a GNSS signal from a satellite that is a transmitter station of the observation data to the own station that is a receiver station of the observation data.

The invalidity determination condition assignment unit 122 receives multipath detection result from the multipath detection unit 121, and assigns an invalidity determination condition (such as exclusion priority or reliability) to the multipath detection result (specifically, observation data determined to be multipath). In the following, indexes such as exclusion priority and reliability which indexes become determination conditions for validity/invalidity (here, indicating whether being multipath) of observation data in positioning calculation using the observation data are collectively referred to as an "invalidity determination condition".

The positioning calculation unit 123 calculates a position of own device on the basis of the multipath detection result by the multipath detection unit 121 and the observation data group acquired by the GNSS receiver 11 (observation data from each reception satellite). On the basis of the multipath detection result, after selecting a reception satellites used for positioning calculation (satellite to be used) or a reception satellite excluded from the positioning calculation (satellite to be excluded), the positioning calculation unit 123 performs the positioning calculation on the basis of observation data from the satellite to be used.

Figure 3:
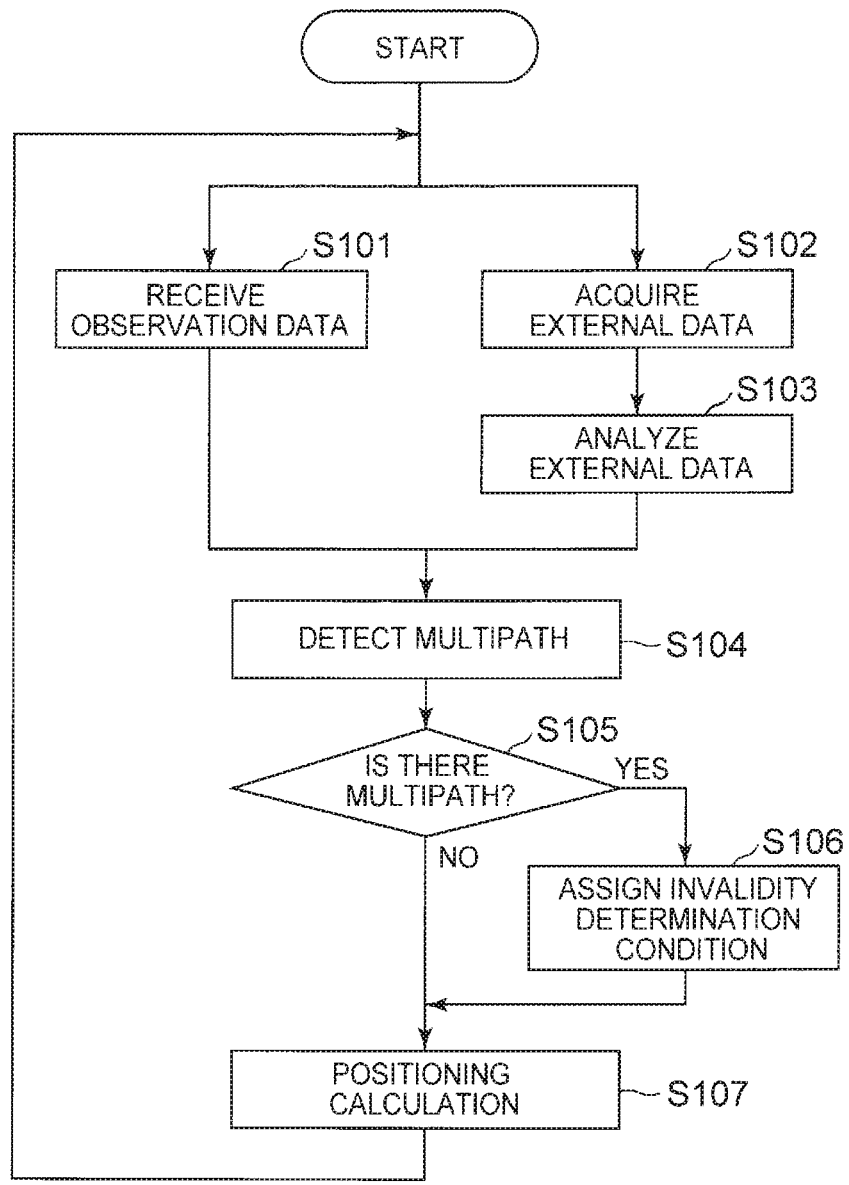
FIG. 3 It depicts a flowchart illustrating an outline of a position detecting operation by a position detection device.
Figure 4:
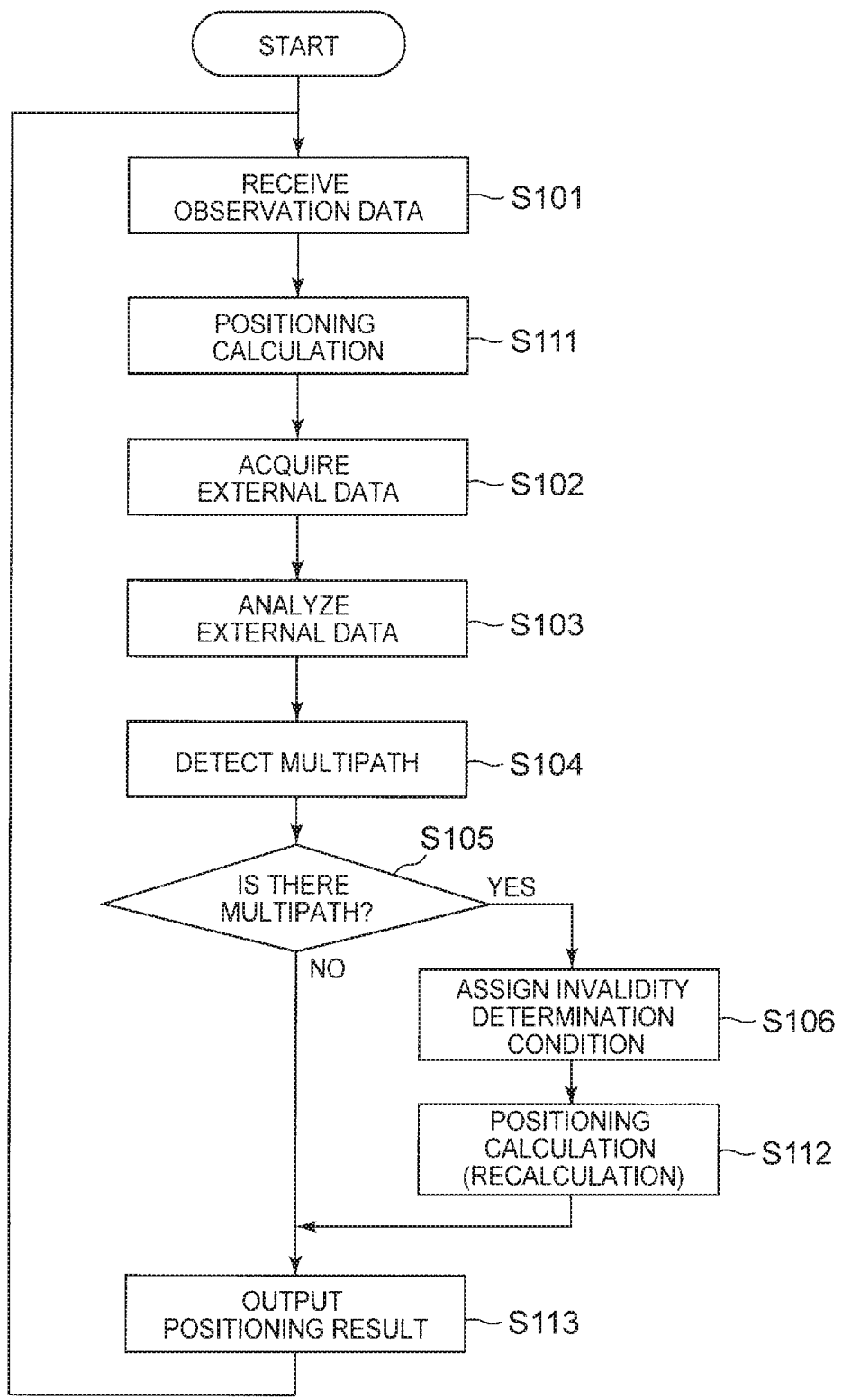
FIG. 4 It depicts a flowchart illustrating an outline of a position detecting operation by the position detection device.

FIG. 3 and FIG. 4 are flowcharts illustrating an outline of position detecting operations in the position detection device 10 described above. Note that the example illustrated in FIG. 3 is an example of receiving observation data, and performing positioning calculation after performing multipath determination first. The example illustrated in FIG. 4 is an example of receiving observation data, performing multipath determination after performing positioning calculation first, and performing recalculation when necessary. In such a manner, determination timing of multipath is not specifically limited. Note that the former is an operation example effective in a case where a current position of the moving body 1 is not used for multipath determination (or highly accurate positional information is not required). On the other hand, the latter is an operation example effective in a case of using a current position of the moving body 1 for multipath determination (or in a case where highly accurate positional information is required) since it is possible to perform multipath determination using the latest positioning calculation result.

First, the example illustrated in FIG. 3 will be described. In the present example, first, the observation data reception unit 101 receives a GNSS signal of each satellite 2 and acquires observation data (Step S101).

Next, the external data acquisition unit 13 acquires external data, analyzes acquired image data, and acquires a predetermined analysis result (Step S102 and Step S103). Note that the order of execution is not specifically limited between Step S101, and Step S102 to Step S103. That is, the latter may be executed first, or both may be performed in parallel or simultaneously.

Next, the multipath detection unit 121 of the positioning unit 12 detects multipath with respect to each piece of observation data in the acquired observation data group on the basis of the analysis result of the external data (Step S104).

In a case where multipath is detected from any piece of the observation data in Step S104 (Yes in Step S105), the invalidity determination condition assignment unit 122 assigns an invalidity determination condition to a multipath detection result (specifically, each piece of observation data determined to be multipath) (Step S106). On the other hand, in a case where no multipath is detected from any piece of the observation data (No in Step S105), the operation directly proceeds to Step S107. Note that the operation of Step S106 can be performed regardless of whether multipath is detected.

Finally, the positioning calculation unit 123 performs positioning calculation on the basis of the acquired observation data group and the multipath detection result (including invalidity determination condition), and outputs a positioning position (calculation result) (Step S107).

For example, the position detection device 10 may perform the above series of operations each time observation data is received.

Next, the example illustrated in FIG. 4 will be described. In the example illustrated in FIG. 4, after the observation data reception unit 101 receives a GNSS signal of each satellite 2 and acquires observation data (own-station observation data) (Step S101), the positioning calculation unit 123 first performs positioning calculation by using the acquired observation data group (Step S111).

On the other hand, the external data acquisition unit 13 acquires external data (Step S102).

Step S102 to Step S104 are similar to those in FIG. 3. Also in the present example, the order of execution is not specifically limited between Step S101 to S111, and Step S102 to Step S103. That is, the latter may be executed first, or both may be performed in parallel or simultaneously.

In the present example, in a case where multipath is detected from any piece of the observation data in Step S104 (Yes in Step S105), the invalidity determination condition assignment unit 122 assigns an invalidity determination condition to a multipath detection result (specifically, each piece of observation data determined to be multipath) (Step S106). Note that the operation of Step S106 may be performed regardless of whether multipath is detected.

After the multipath is detected and the invalidation determination condition is assigned, the positioning calculation unit 123 performs the positioning calculation again on the basis of the acquired observation data group and the multipath detection result (including invalidity determination condition) (Step S112). The positioning calculation in Step S112 may be similar to that in Step S107 in FIG. 3.

On the other hand, in a case where no multipath is detected from any piece of the observation data in Step S104 (No in Step S105), the operation directly proceeds to Step S113.

In Step S113, the positioning calculation unit 123 outputs a result of the positioning calculation. The positioning calculation unit 123 preferably outputs a calculation result of recalculation in a case where the recalculation is performed in Step S112, and preferably outputs a calculation result in Step S111 otherwise.

In the present example as well, the position detection device 10 may perform the above series of operations each time observation data is received.

In such a manner, multipath is detected with respect to the received observation data group by utilization of not only the observation data but also the external data, and a multipath detection result to which an invalidity determination condition is assigned when necessary is given to the positioning calculation unit 123 in a subsequent stage. Then, since the positioning calculation unit 123 in the subsequent stage can perform exclusion from a target of positioning calculation or can lower priority with respect to observation data in which multipath is detected, calculation accuracy of a positioning position can be improved.

In each of the following exemplary embodiments, a technology of improving accuracy of satellite positioning using external data in the moving body 1 as described above will be described in more detail.

First Exemplary Embodiment

Figure 5:
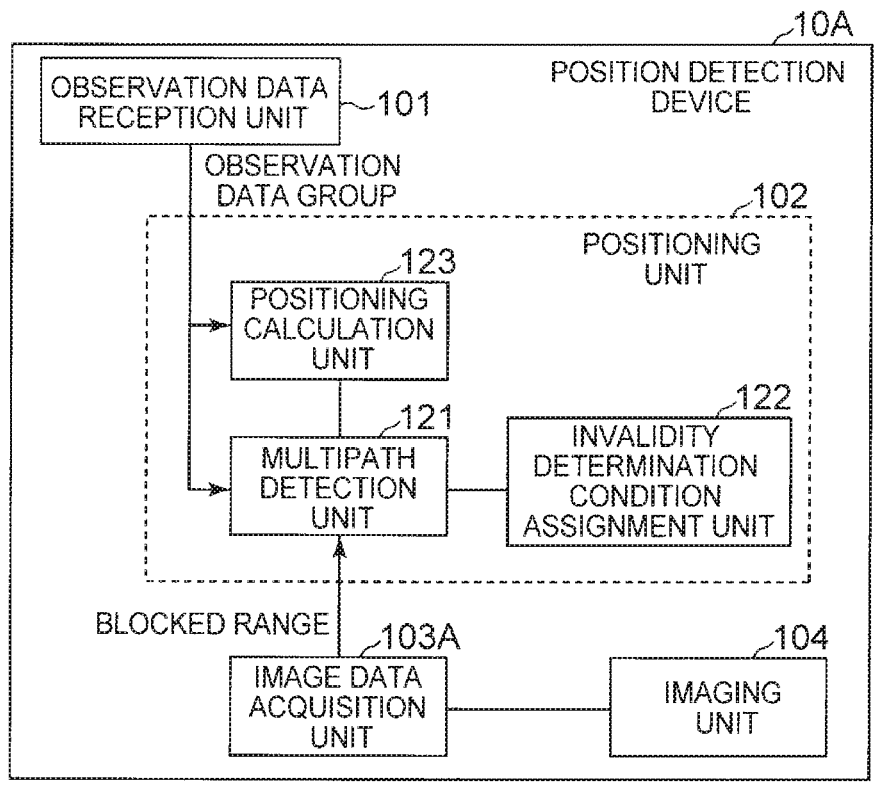
FIG. 5 It depicts a block diagram illustrating a configuration example of a position detection device of a first exemplary embodiment.

FIG. 5 is a block diagram illustrating a configuration example of a position detection device 10A of the first exemplary embodiment. The position detection device 10A illustrated in FIG. 5 includes an observation data reception unit 101, a positioning unit 102, an image data acquisition unit 103A, and an imaging unit 104. The positioning unit 102 also includes a multipath detection unit 121, an invalidity determination condition assignment unit 122, and a positioning calculation unit 123.

In the present example, the observation data reception unit 101 corresponds to the above GNSS receiver 11, and the positioning unit 102 corresponds to the above positioning unit 12. Also, the image data acquisition unit 103A corresponds to the external data acquisition unit 13, and the imaging unit 104 corresponds to the camera device 14 in the moving body-side function of the external data system 20 described above.

The observation data reception unit 101 observes (receive) GNSS signals from one or a plurality of satellites 2 that are transmitter stations in a satellite positioning system, and acquires predetermined observation data from each of reception signals that are the received GNSS signals. Here, the observation data is data acquired by an analysis of the reception signals and is not specifically limited as long as being information that enables positioning calculation. As an example, a pseudo distance to a reception satellite (distance between a reception satellite and an own device based on propagation time of a reception signal), information related to an orbit of the reception satellite (orbit information), clock information, and the like may be included. In the following, there is a case where observation data acquired from a GNSS signal received from a certain satellite is simply referred to as observation data from the satellite (reception satellite).

The image data acquisition unit 103A controls the imaging unit 104 included in the own device to photograph a surrounding environment of the own device, and acquires image data of the captured image. Here, the imaging unit 104 may be a monocular camera, a stereo camera, or an omnidirectional camera. Note that the image data acquisition unit 103A may acquire time-series image data by causing photographing a plurality of times, for example, at predetermined time intervals. Also, in a case where the moving body 1 includes a camera device that constantly photographs a predetermined direction, the image data acquisition unit 103A uses the latest time-series image data from a buffer or the like that holds streaming image data output from the camera device. Specifically, in a case of a monocular camera, time-series data is necessary to perform three-dimensional measurement of a width, height, and the like of a subject.

Also, the image data acquisition unit 103A detects a ground surface object around the own device by analyzing the acquired image data, and identifies a blocked range that is a range in which a sky (more specifically, GNSS signal) is blocked in the own device on the basis of a position and a size of the detected ground surface object. The blocked range may be indicated by an azimuth angle $\theta$ and an elevation angle $\varphi$, for example. Note that the azimuth angle $\theta$ is not limited to an angle based on the north, and may be an angle based on a predetermined direction in the own device.

The image data acquisition unit 103A may detect a surrounding environment of the own device, specifically, a ground surface object that may block a GNSS signal as a blocking object by analyzing the image data, and may identify a blocked range of a wireless signal in the own device due to the blocking object by identifying a range of the blocking object viewed from the own device, such as an azimuth angle range (for example, $\theta_{min}$ and $\theta_{max}$) and an elevation angle range (for example, $\varphi_{min}$ and $\varphi_{max}$) in which the blocking object exists. The range of the blocking object can be identified on the basis of a distance between the own device and the blocking object, and a size (width or height) of the blocking object, for example. Note that in a case where there are two or more blocking objects, a blocked range due to each blocking object are preferably identified. Here, the image data acquisition unit 103A may identify a final blocked range by superimposing the blocked ranges due to the blocking objects.

Figure 6:
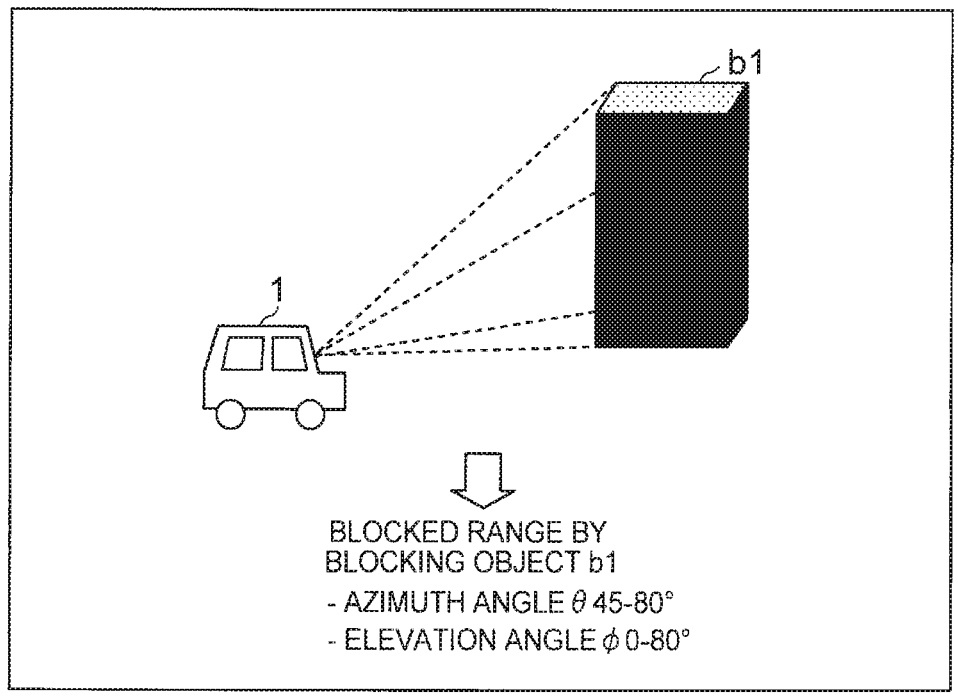
FIG. 6 It depicts a view for describing an example of surrounding environment grasping based on image data.

FIG. 6 is a view for describing an example of surrounding environment grasping based on image data. In FIG. 6, an example in which an azimuth angle range 45 to 80° and an elevation angle range 0 to 80° are identified as a blocked range due to one blocking object b1 as a result of an analysis of image data is illustrated. Note that although a vehicle is illustrated as a moving body 1 in FIG. 6, the moving body 1 is not limited to the vehicle.

For example, in a case where the image data is image data photographed by a stereo camera, the image data acquisition unit 103A may acquire image data in which a front direction of the moving body 1 is photographed. Then, a size of the blocking object may be identified by three-dimensional measurement including depth estimation based on a principle of stereoscopy with respect to a subject of the image data. Note that existing technologies can be used for the depth estimation based on the principle of stereoscopy and the three-dimensional measurement.

Also, for example, in a case where the image data is image data photographed by a monocular camera, the image data acquisition unit 103A may acquire time-series image data in which the front direction of the moving body 1 is photographed. Then, three-dimensional measurement of a subject of the image data is preferably performed by processing similar to the depth estimation by stereoscopy by utilization of the time-series image data. Note that an existing technology can also be used for depth estimation and three-dimensional measurement using time-series image data.

Also, for example, in a case where the image data is image data photographed by an omnidirectional camera, the image data acquisition unit 103A preferably performs three-dimensional measurement of a subject of the image data by realizing pseudo stereoscopy, for example, by dividing the image data by a predetermined azimuth angle range, or performing processing similar to the depth estimation by the stereoscopy by using time-series data of the image data.

Figure 7:
FIG. 7 It depicts a view for describing an example of a non-blocked range.

When performing three-dimensional measurement with respect to a subject of image data, the image data acquisition unit 103A may previously identify a range in which a blocking object is not expected to exist (non-blocked range) such as a road portion in the image, and may perform processing of excluding the identified range from a detection object for a blocking object (see FIG. 7). In such a manner, it is possible to reduce a processing load by limiting a range to be detected. FIG. 7 is a view for describing an example of a non-blocked range. FIG. 7 is an example in which a lower half of a screen (region surrounded by a broken line) identified as a road region is set as a non-blocked range.

The multipath detection unit 121 of the present exemplary embodiment performs multipath detection on the basis of an observation data group and a blocked range by each blocking object which range is an analysis result of external data. More specifically, the multipath detection unit 121 of the present exemplary embodiment detects multipath by determining, for each piece of observation data, whether a reception satellite position identified from the observation data overlaps with a blocked range due to each blocking object.

For example, the multipath detection unit 121 identifies, on the basis of each piece of observation data (such as orbit information and clock information) included in the observation data group, an azimuth angle $\theta$ and an elevation angle $\varphi$ of each reception satellite viewed from the own device, and determines whether the identified azimuth angle $\theta$ and elevation angle $\varphi$ are included in a blocked range by any blocking object.

Here, the multipath detection unit 121 may identify the azimuth angle $\theta$ and the elevation angle of the reception satellite viewed from the own device on the basis of the latest own device position and observation data. As the latest own device position, the latest position of the own device which position is calculated by the positioning calculation unit 123 may be used, or an own device position (predicted) in which the latest position is further updated on the basis of a speed and a moving direction of the moving body may be used.

Figure 8:
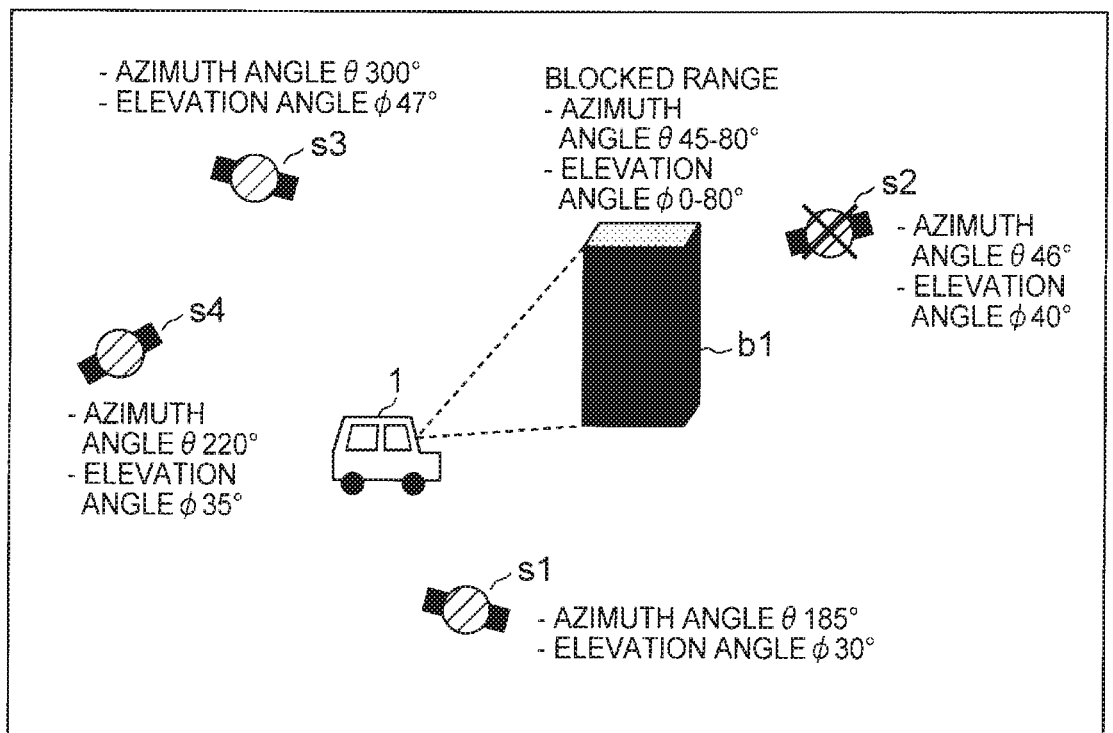
FIG. 8 It depicts a view for describing an example of a multipath detection result.

FIG. 8 is a view for describing an example of a multipath detection result by the multipath detection unit 121 of the present exemplary embodiment. As illustrated in FIG. 8, the multipath detection unit 121 compares an azimuth angle $\theta$ and an elevation angle $\varphi$ of each reception satellite identified from each piece of observation data included in an observation data group with a blocked range of the own device, that is, an azimuth angle range ($\theta_{min}$, $\theta_{max}$) and an elevation angle range ($\varphi_{min}$, $\varphi_{max}$) in which a blocking object exists, and determines, in a case where there is a reception satellite included in the blocked range of the own device, that observation data from the reception satellite is multipath.

Note that a certain moving body 1 acquires observation data from four satellites 2 (s1 to s4 in the drawing) in the example illustrated in FIG. 8. Also, as a result of an analysis of the image data photographed by the moving body 1 itself, one blocking object b1 is identified. Note that a position Pi (si$\theta$, si$\varphi$) of each reception satellite si and a blocked range Rj ((bj$\theta_{min}$, bj$\theta_{max}$), (bj$\varphi_{min}$, bj$\varphi_{max}$)) by a blocking object bj are as follows.

Position P1 of reception satellite s1=(185, 30)
Position P2 of reception satellite s2=(46, 40)
Position P3 of reception satellite s3=(300, 47)
Position P4 of reception satellite s4=(220, 35)

Blocked range R1 due to blocking object b1=((45, 80), (0, 80))

For example, the multipath detection unit 121 may compare a position Pi of each reception satellite si with a blocked range Rj by each blocking object bj, and may determine, in a case where the following expression (1) holds for any j, that observation data from the reception satellite si is multipath.

$$bj\theta_{min} \leq si\theta \leq bj\theta_{max} \text{ and } bj\varphi_{min} \leq si\varphi \leq bj\varphi_{max} \quad (1)$$

In the example illustrated in FIG. 8, since $b1\theta_{min} \leq s2\theta \leq b1\theta_{max}$ and $b1\varphi_{min} \leq s2\varphi \leq b1\varphi_{max}$ are satisfied as a result of a comparison between the position P2 of the reception satellite s2 and the blocked range R1 of the blocking object b1, the multipath detection unit 121 determines that observation data from the reception satellite s2 is multipath.

On the basis of a multipath detection result by the multipath detection unit 121, the invalidity determination condition assignment unit 122 assigns an invalidity determination condition (such as exclusion priority or reliability) to at least observation data determined to be multipath. For example, the invalidity determination condition assignment unit 122 assigns, on the basis of the detection result of multipath or information used for the detection, an invalidity determination condition (such as exclusion priority or reliability) to at least the observation data determined to be multipath. Here, the invalidity determination condition is, for example, a part of a multipath detection result for an observation data group.

FIG. 9 is a view for describing an example of observation data and surrounding environment grasping in the moving body 1. In the example illustrated in FIG. 9, a certain moving body 1 acquires observation data from four satellites 2 (s1 to s4 in the drawing). Also, as a result of an analysis of image data photographed by the moving body 1 itself, three blocking objects b1 to b3 are identified. In FIGS. 10(*a*) and 10(*b*), an example of a position of each reception satellite and a blocked range by each blocking object acquired from each piece of observation data in the present example is illustrated. FIG. 10(*c*) is a view for describing a multipath detection example based on the surrounding environment grasping illustrated in FIG. 9. Note that a position Pi ($si\theta$, $si\varphi$) of each reception satellite si and a blocked range Rj (($bj\theta_{min}$, $bj\theta_{max}$), ($bj\varphi_{min}$, $bj\varphi_{max}$)) by a blocking object bj in the present example are as follows.

Position P1 of reception satellite s1=(185, 30)
Position P2 of reception satellite s2=(46, 40)
Position P3 of reception satellite s3=(300, 47)
Position P4 of reception satellite s4=(220, 35)
Blocked range R1 due to blocking object b1=((45, 80), (0, 80))
Blocked range R2 due to blocking object b2=((180, 190), (0, 65))
Blocked range R3 due to blocking object b1=((270, 320), (0, 50))

The multipath detection unit 121 of the present example determines that observation data from the reception satellite s1 is multipath since the reception satellite s1 satisfies the above expression (1) with the blocking object b2. Also, the multipath detection unit 121 determines that observation data from the reception satellite s2 is multipath since the reception satellite s2 satisfies the above expression (1) with the blocking object b1. Also, the multipath detection unit 121 determines that observation data from the reception satellite s3 is multipath since the reception satellite s3 satisfies the above expression (1) with the blocking object b3. Also, the multipath detection unit 121 determines that observation data from the reception satellite s4 is not multipath since the reception satellite s4 does not satisfy the above expression (1) with any of the blocking objects bj.

In FIG. 10(*c*), a degree of overlap and exclusion priority are illustrated together with a multipath detection result. Here, the degree of overlap is an index indicating a degree of overlap with a blocked range with respect to each of an azimuth angle $\theta$ and an elevation angle $\varphi$ of a reception satellite. In the example illustrated in the following, in a case where a reception satellite is included in a blocked range by any of the blocking objects bj, the degree of overlap is defined as a minimum angle among angles formed between a position of the reception satellite and end points of the blocked range. Note that in a case where the reception satellite is not included in a blocked range by any of the blocking objects bj, a degree of overlap $\theta'$ of an azimuth angle $\theta$ is set to be a negative value of a minimum angle (-minimum angle) among the angles formed by the position of the reception satellite and the end points of the blocked range by each blocking object, and a degree of overlap $\varphi'$ of the elevation angle $\varphi$ is set to a minimum angle (positive value when being included in the blocked range, and negative value when not being included therein) among angles formed with respect to end points of a blocked range by a blocking object having a minimum degree at the azimuth range $\theta$.

For example, since the reception satellite s1 is included in a blocked range by the blocking object b2, a degree of overlap $s1\theta'$ of an azimuth angle $s1\theta$ and a degree of overlap $s1\varphi'$ of an elevation angle slip are respectively calculated as follows. Note that in the following, $|a-b|_d$ expresses an angle formed by an angle a and an angle b.

$$s1\theta' = \min(|s1\theta - b2\theta_{min}|_d, |s1\theta - b2\theta_{max}|_d)$$
$$= \min(|185° - 180°|_d), |185° - 190°|_d))$$
$$= 5°$$

$$s1\varphi' = \min(|s1\varphi - b2\varphi_{min}|_d, |s1\varphi - b2\varphi_{max}|_d)$$
$$= \min(|30° - 0°|_d), |30° - 60°|_d))$$
$$= 30°$$

Also, for example, since the above reception satellite s4 is not included in a blocked range by any of the blocking objects, a degree of overlap $s4\theta'$ of an azimuth angle $s4\theta$ is calculated as follows.

Degree of overlap $s4b1\theta'$ with blocking object b1

$$s4b2\theta' = \min(|s4\theta - b2\theta_{min}|_d, |s4\theta - b12_{max}|_d)$$
$$= \min(|220° - 180°|_d), |220° - 190°|_d))$$
$$= -30°$$

Degree of overlap $s4b1\theta'$ with blocking object b2

$$s4b3\theta' = \min(|s4\theta - b3\theta_{min}|_d, |s4\theta - b3\theta_{max}|_d)$$
$$= \min(|220° - 270°|_d), |220° - 320°|_d))$$
$$= -50°$$

-continued

Therefore, $$s4\varphi' = \min(-140°, -30°, -50°) = -30°$$

Degree of overlap s4b1θ' with blocking object b3

$$s4b1\theta' = -(\min(|s4\theta - b1\theta_{min}|_d, |s4\theta - b1\theta_{max}|_d))$$
$$= -(\min(|220° - 45°|_d), |220° - 80°|_d)))$$
$$= -140°$$

From this, for example, the degree of overlap s4φ' of the elevation angle s4φ of the reception satellite s4 is calculated as follows, Degree of overlap s4b2φ' with blocking object b2

$$s4b2\varphi' = \min(|s4\varphi - b2\varphi_{min}|_d, |s4\varphi - b2\varphi_{max}|_d)$$
$$= \min(|35° - 0°|_d), |35° - 65°|_d))$$
$$= 30°$$

Therefore, $$s4\varphi' = s4b2\varphi' = 30°$$

For example, the invalidity determination condition assignment unit 122 may acquire degrees of overlap θ' and φ' with the blocked ranges with respect to each reception satellite, and may identify exclusion priority order on the basis of the degrees of overlap. The invalidity determination condition assignment unit 122 extracts, for example, a smaller degree of overlap (hereinafter referred to as first degree of overlap) in θ' and φ' from each reception satellite, and may set, as exclusion priority, an arrangement of the extracted first degrees of overlap in descending order. Note that when there are the same degrees of overlap, ordering thereof is preferably performed on the basis of the other degrees of overlap thereof (second degree of overlap). In FIG. 10(c), since first degrees of overlap of the reception satellites are s4θ'<s2θ'<s3φ'<s1θ', it is indicated that the exclusion priority is identified as s1→s3→s2→s4. Note that this expresses that s1 is the most likely to be excluded and s4 is the least likely to be excluded. Note that the invalidity determination condition assignment unit 122 can also assign reliability to each piece of observation data on the basis of a first degree of overlap. The invalidity determination condition assignment unit 122 may assign the reliability to each piece of observation data by using, for example, a predetermined function in which the reliability becomes lower as the first degree of overlap becomes higher. Note that the invalidity determination condition assignment unit 122 may assign reliability by threshold determination instead of the function, and can assign multi-stage reliability by using two or more thresholds in this case.

The positioning calculation unit 123 calculates an own device position on the basis of the observation data group (observation data from each reception satellite) acquired by the observation data reception unit 101. The positioning calculation unit 123 may calculate a position of the own device by performing predetermined positioning calculation by using observation data included in the observation data group, for example.

However, in a case where a multipath detection result is acquired from the multipath detection unit 121, the positioning calculation unit 123 of the present exemplary embodiment calculates a position of the own device on the basis of the observation data group and the multipath detection result (including invalidity determination condition). For example, after selecting a satellite to be used or a satellite to be excluded on the basis of the multipath detection result, the positioning calculation unit 123 may perform predetermined positioning calculation by using observation data from a reception satellite selected as the satellite to be used and reliability assigned to the observation data when the reliability is assigned thereto, and calculate a position of the own device. Note that existing technologies can be used for positioning calculation based on observation data and positioning calculation using reliability.

Note that the positioning calculation unit 123 may determine a satellite to be used or a satellite to be excluded on the basis of not only an invalidity determination condition assigned to a multipath detection result (determination condition based on a blocked degree of a reception satellite in the present exemplary embodiment) but also the number of satellites on which positioning calculation can be performed, or validity of an arrangement of each reception satellite.

Generally, satellite positioning requires calculation of four variables of a position (x, y, z) and time (t), and requires at least four reception satellites. Thus, a reception satellite determined to be multipath may be excluded after determination whether the number of satellites on which positioning calculation can be performed is sufficiently secured (for example, four or more reception satellites that are not multipath).

Also, when counting the number of satellites on which positioning calculation can be performed, the positioning calculation unit 123 may further determine goodness of a satellite arrangement, that is, whether dilution of precision (DOP) is an acceptable value (does not exceed a predetermined threshold). Here, as the DOP, there are geometrical dilution of precision (GDOP), position dilution of precision (PDOP), horizontal dilution of precision (HDOP), a vertical dilution of precision (VDOP), and the like. The positioning calculation unit 123 may perform the above determination, for example, with the number of reception satellites in which each of these kinds of DOP does not exceed a predetermined threshold and which are not multipath being "the number of satellites on which positioning calculation can be performed".

In the following, an example of a method of determining a satellite to be excluded of a case where three conditions that are (1) the number of satellites on which positioning calculation can be performed (number of reception satellites not including multipath), (2) the goodness of a satellite arrangement (DOP), and (3) a blocked degree are used as satellite exclusion conditions is described. For example, in a case where the number of satellites satisfying the conditions (1) and (2) is sufficiently large, the positioning calculation unit 123 may determine a satellite to be excluded serially from what having high exclusion priority indicated by the condition (3) within the range satisfying the conditions (1) and (2). By excluding a satellite that becomes a cause of decreasing accuracy in such a manner, it is possible to improve positioning position accuracy.

Also, for example, in a case where the number of satellites satisfying the conditions (1) and (2) is insufficient, the positioning calculation unit 123 may add a satellite to be used in opposite order (ascending order) of the exclusion priority indicated by the condition (3) until the conditions (1) and (2) are satisfied. In such a manner, by additional utilization of only satellites that are assumed to have a small influence of multipath, positioning position accuracy is secured while availability is secured.

Note that, although an example in which the position detection device 10A in the moving body 1 includes the positioning unit 102 is illustrated in FIG. 5, a positioning unit 102 may be included in an external server or the like, for example. In that case, a position detection device 10A may include, instead of those processing units, a communication unit (not illustrated) that transmits observation data from each reception satellite or image data from an imaging unit 104 to the server, and receives a positioning position (own device position) as a positioning calculation result based on these from the server.

Figure 11:
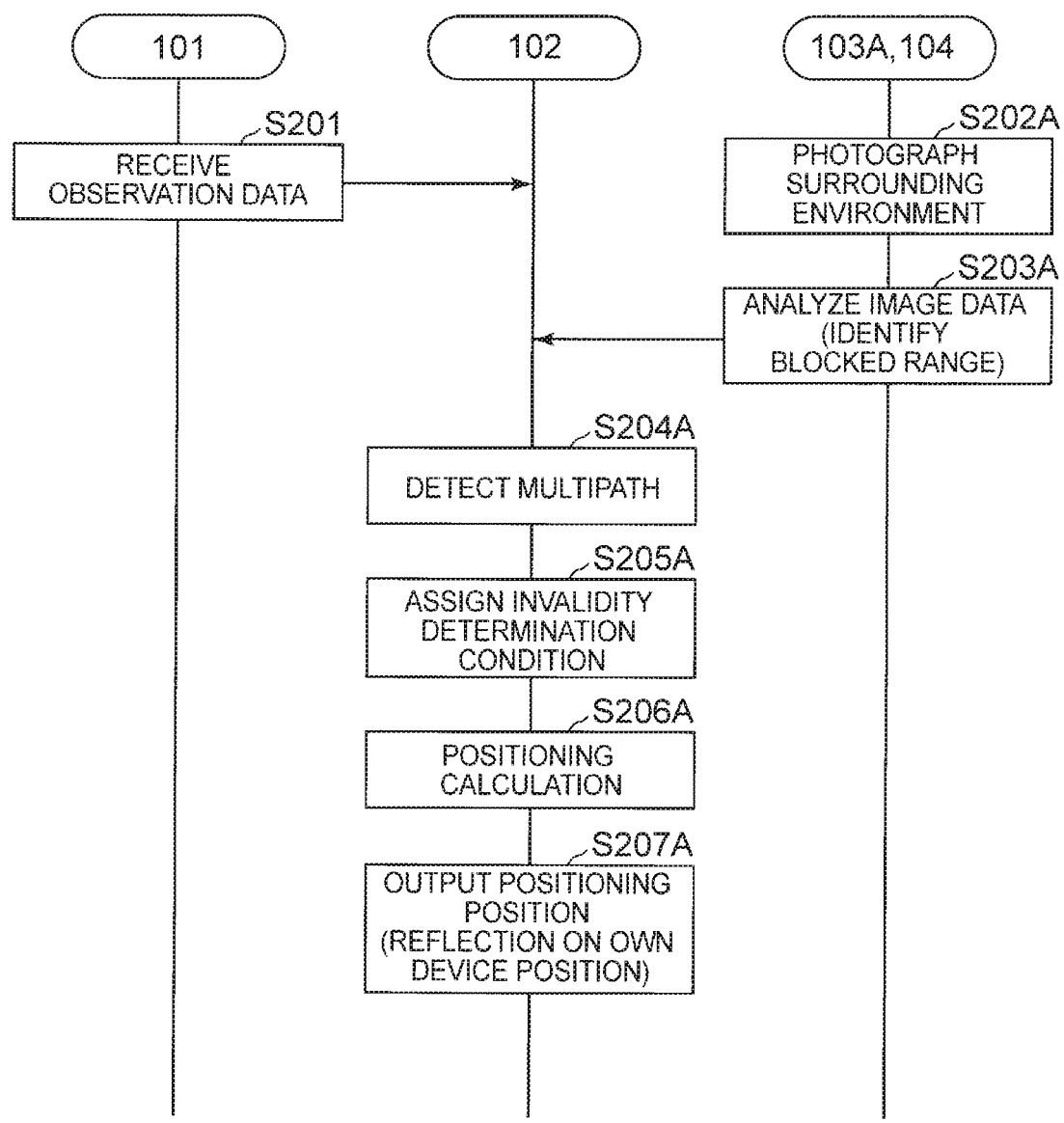
FIG. 11 It depicts a sequence diagram illustrating an operation example of the position detection device of the first exemplary embodiment.

Next, an operation of the present exemplary embodiment will be described. FIG. 11 is a sequence diagram illustrating an operation example of the position detection device 10A of the present exemplary embodiment. Note that in FIG. 11, the operation of the position detection device 10A is divided broadly into three that are an observation data reception process by the observation data reception unit 101, an external data acquisition process by the imaging unit 104 and the image data acquisition unit 103A, and a positioning process by the positioning unit 102. However, the way of dividing the processes is an example and not a limitation.

In the example illustrated in FIG. 11, the observation data reception unit 101 receives a GNSS signal of each satellite 2 and acquires observation data (Step S201). The acquired observation data group is input to the positioning unit 102 (more specifically, multipath detection unit 121 and positioning calculation unit 123).

Also, the imaging unit 104 acquires image data of a surrounding environment of the own device according to an instruction from the image data acquisition unit 1034 (Step S202A). The acquired image data is input to the image data acquisition unit 103A.

When the image data is input, the image data acquisition unit 103A analyzes the image data and identifies a blocked range in the own device (Step S203A). The identified blocked range is input to the positioning unit 102 (more specifically, multipath detection unit 121) as an external data analysis result. Here, the image data acquisition unit 103A may hold a predetermined amount of image data in time series. By using the held image data in addition to the acquired image data, it is possible to grasp a wider environment. Also, the image data acquisition unit 103A can identify a non-blocked range when analyzing the acquired image data, and previously limit a range used for grasping the environment in the image.

Next, when an observation data group and the blocked range are input, the multipath detection unit 121 detects multipath in the observation data group on the basis of the observation data group and the blocked range that is the external data analysis result (Step S204A).

When the multipath detection unit 121 ends detection of multipath, the invalidity determination condition assignment unit 122 assigns an invalidity determination condition to a multipath detection result on the basis of the multipath detection result and the external data analysis result used for the multipath detection (Step S205A).

Next, the positioning calculation unit 123 performs positioning calculation with the observation data group and the multipath detection result (including invalidity determination condition) as input (Step S206A). In Step S206A, after performing selection of a satellite to be used or weighting of observation data by using the multipath detection result, the positioning calculation unit 123 performs positioning calculation on the basis of observation data from the satellite to be used. Finally, the positioning calculation unit 123 outputs a positioning position acquired as a result of the positioning calculation and reflects the positioning position as a current position of the own device (Step S207A).

Note that in the above, the image analysis processing in Step S203A, the multipath detection processing in Step S204A to S205A, and the positioning calculation processing in Step S206A may be performed by an external server or a different process (such as processing device for an image, or processing device for positioning calculation). In such a manner, by distributing the processing (such as by separating image processing or arithmetic processing to a GNSS receiver or a camera device included in the moving body 1 or an application that uses a positioning position), it is possible to reduce a load of processing on the moving body 1.

In such a manner, according to the present exemplary embodiment, since image data photographed by a camera device included in the own device is used, a surrounding environment can be grasped in real time and multipath can be detected more accurately. As a result, a current position of a moving body can be detected more accurately. Also, according to the present exemplary embodiment, by assigning an invalidity determination condition to a multipath detection result, it is possible to appropriately select the number of satellites, which is used for positioning calculation, or observation data or to appropriately set a weight or the like of the observation data by a positioning calculation unit in a subsequent stage. Thus, it is possible to secure positioning accuracy while securing availability.

Second Exemplary Embodiment

Figure 12:
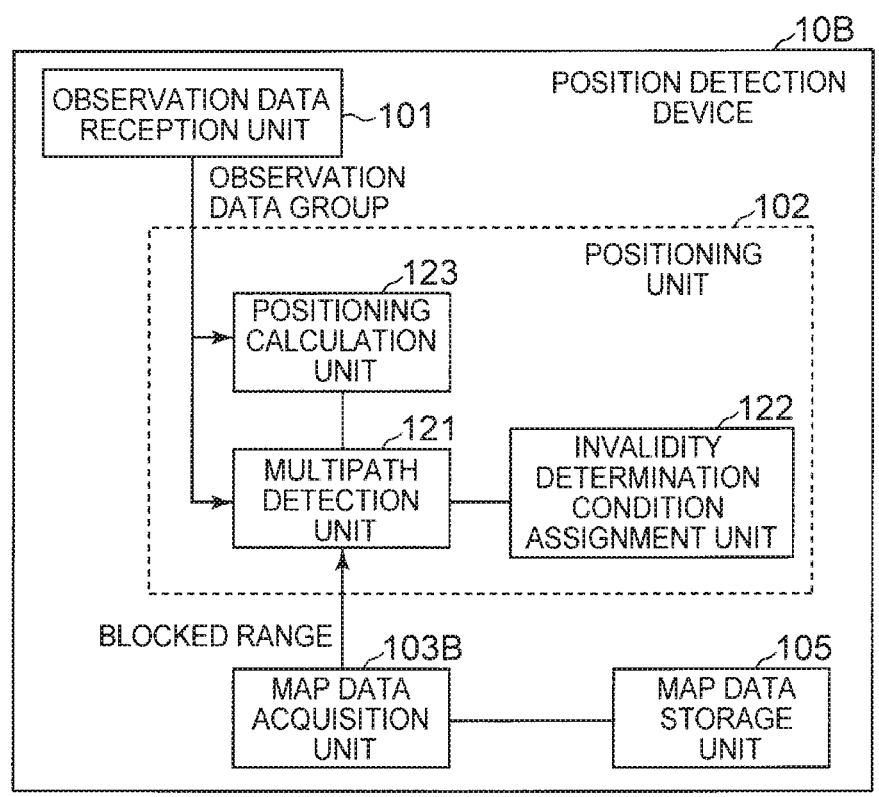
FIG. 12 It depicts a block diagram illustrating a configuration example of a position detection device of a second exemplary embodiment.

FIG. 12 is a block diagram illustrating a configuration example of a position detection device 10B of the second exemplary embodiment. The position detection device 10B illustrated in FIG. 12 is different from the position detection device 10A of the first exemplary embodiment illustrated in FIG. 5 in a point that a map data acquisition unit 103B is included instead of the image data acquisition unit 103A, and in a point that a map data storage unit 105 is included instead of the imaging unit 104.

In the present example, the map data acquisition unit 103B corresponds to the external data acquisition unit 13, and the map data storage unit 105 corresponds to the map data storage device 15 in the moving body-side function of the external data system 20 described above.

The map data storage unit 105 stores three-dimensional map data. The map data stored in the map data storage unit 105 at least includes static information indicating a position and a size (such as width and height) of a ground surface object that may be a blocking object of a GNSS signal and that is, for example, a major building, a mountain, or a tree. The map data may be, for example, highly accurate three-dimensional digital map data called a dynamic map.

The map data acquisition unit 103B reads information (position and size) of the ground surface object from the map data storage unit 105, and identifies a blocked range due to the blocking object on the basis of the read information of the ground surface object. For example, the map data acquisition unit 103B may regard, as a blocking object, a ground surface object within a predetermined range (for example, a radius being r or smaller and a height being h or higher) centered on a positioning position (current position of the own device), and identify a blocked range due to each blocking object from information (position and size) of the ground surface object regarded as the blocking object and the current position of the own device. A method of identifying a blocked range due to a blocking object from a position and size of the ground surface object (blocking object) and a position of the own device may be similar to that in the first exemplary embodiment.

Also, in a case where a position of each reception satellite is already acquired from each piece of observation data, the map data acquisition unit 103B may prepare the amount of information of a ground surface object to be read on the basis of the position. For example, the map data acquisition unit 103B may not read information of a ground surface object in a direction (predetermined angle range) in which no reception satellite exists in the range of the radius r.

Figure 13:
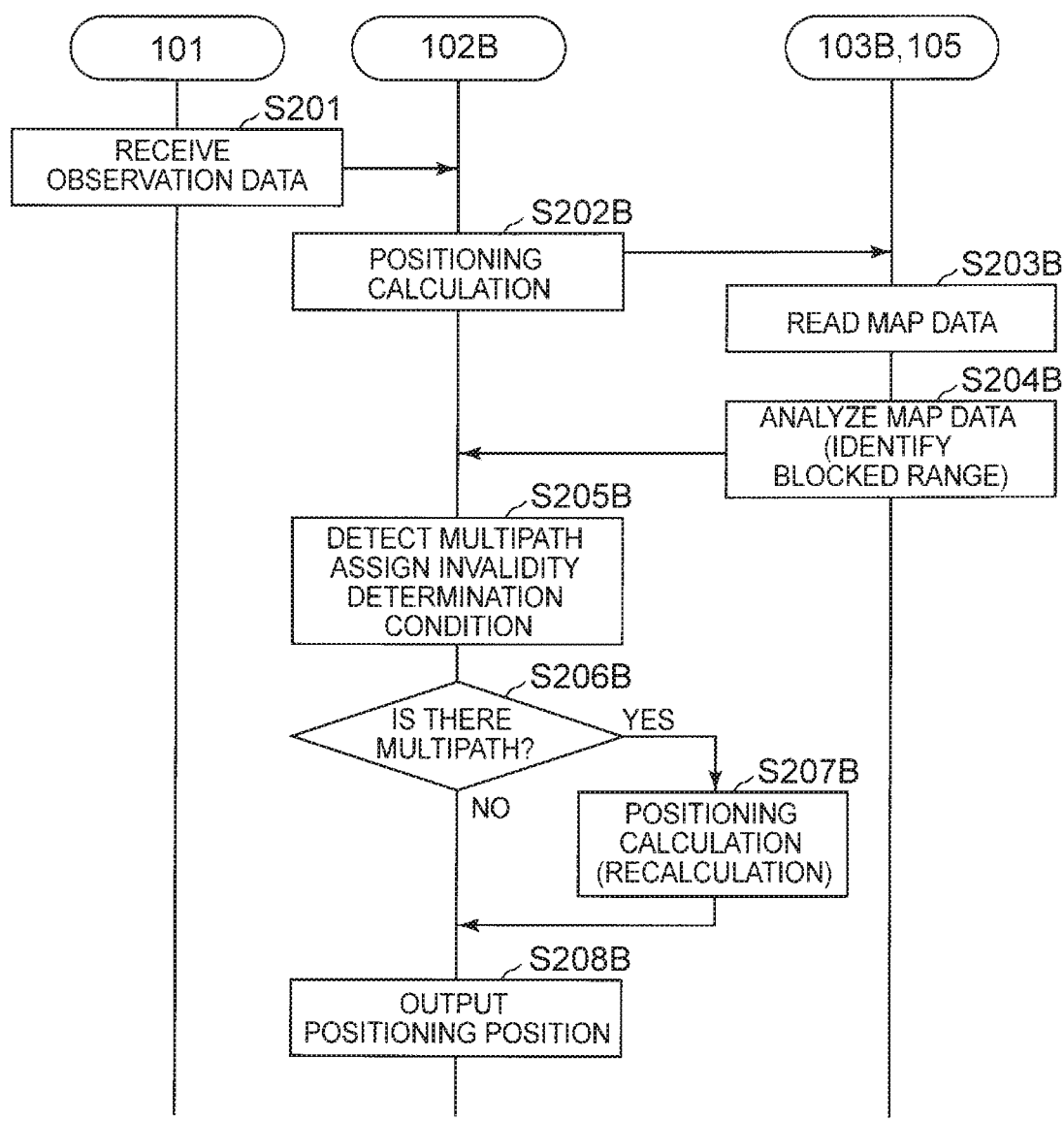
FIG. 13 It depicts a sequence diagram illustrating an operation example of the position detection device of the second exemplary embodiment.

Next, an operation of the present exemplary embodiment will be described. FIG. 13 is a sequence diagram illustrating an operation example of the position detection device 10B of the present exemplary embodiment. Note that in FIG. 13, the operation of the position detection device 10B is broadly divided into three that are an observation data reception process by an observation data reception unit 101, an external data acquisition process by the map data storage unit 105 and the map data acquisition unit 103B, a positioning process by a positioning unit 102. However, the way of dividing the processes is an example and is not a limitation.

In the example illustrated in FIG. 13, the observation data reception unit 101 first receives a GNSS signal of each satellite 2 and acquires observation data (Step S201). The acquired observation data group is input to the positioning unit 102 (more specifically, multipath detection unit 121 and positioning calculation unit 123).

Next, the positioning calculation unit 123 performs positioning calculation based on the observation data group with the observation data group as an input (Step S202B). A positioning position acquired as a result of the positioning calculation is input to the map data acquisition unit 103B. Here, positional information of the reception satellite may be input together.

Note that the positioning calculation unit 123 (or different processing unit) may perform processing of estimating the latest own device position from the latest positioning position instead of the positioning calculation in Step S202B. In that case, the latest own device position may be estimated from a positioning position on which a previous multipath detection result is reflected.

Also, when a position of the own station is input, the map data acquisition unit 103B acquires information of a certain ground surface object around the own device from the map data storage unit 105 (Step S203B: reading of map data). Then, the map data acquisition unit 103B analyzes the read information and identifies a blocked range in the own device (Step S204B). The identified blocked range is input to the positioning unit 102 (more specifically, multipath detection unit 121) as an external data analysis result.

Next, when the observation data group and the blocked range are input, the multipath detection unit 121 detects multipath in the observation data group on the basis of the observation data group and the blocked range (Step S205B). Also, here, the invalidity determination condition assignment unit 122 assigns an invalidity determination condition to a multipath detection result on the basis of the multipath detection result and an external data analysis result used for detection of the multipath.

Next, existence/non-existence of multipath is determined (Step S206B). When the multipath is detected (Yes in Step S206B), the positioning calculation unit 123 performs the positioning calculation again by using a detection result of the multipath (Step S207B: recalculation). Here, the positioning calculation unit 123 preferably performs positioning calculation based on observation data from a satellite to be used after performing selection of the satellite to be used, weighting of the observation data, and the like on the basis of the multipath detection result.

Finally, the positioning calculation unit 123 outputs a positioning position acquired as a result of the positioning calculation and reflects the positioning position as a current position of the own device (Step S208B). In Step S208B, the positioning calculation unit 123 preferably outputs a calculation result of recalculation in a case where the recalculation is performed, and outputs the calculation result in Step S202B otherwise.

As described above, according to the present exemplary embodiment, it is possible to detect multipath more accurately since it becomes possible to grasp various kinds of environments in a wider range by using map data. As a result, a current position of a moving body can be detected more accurately. Note that the other points are similar to those of the first exemplary embodiment.

Third Exemplary Embodiment

Figure 14:
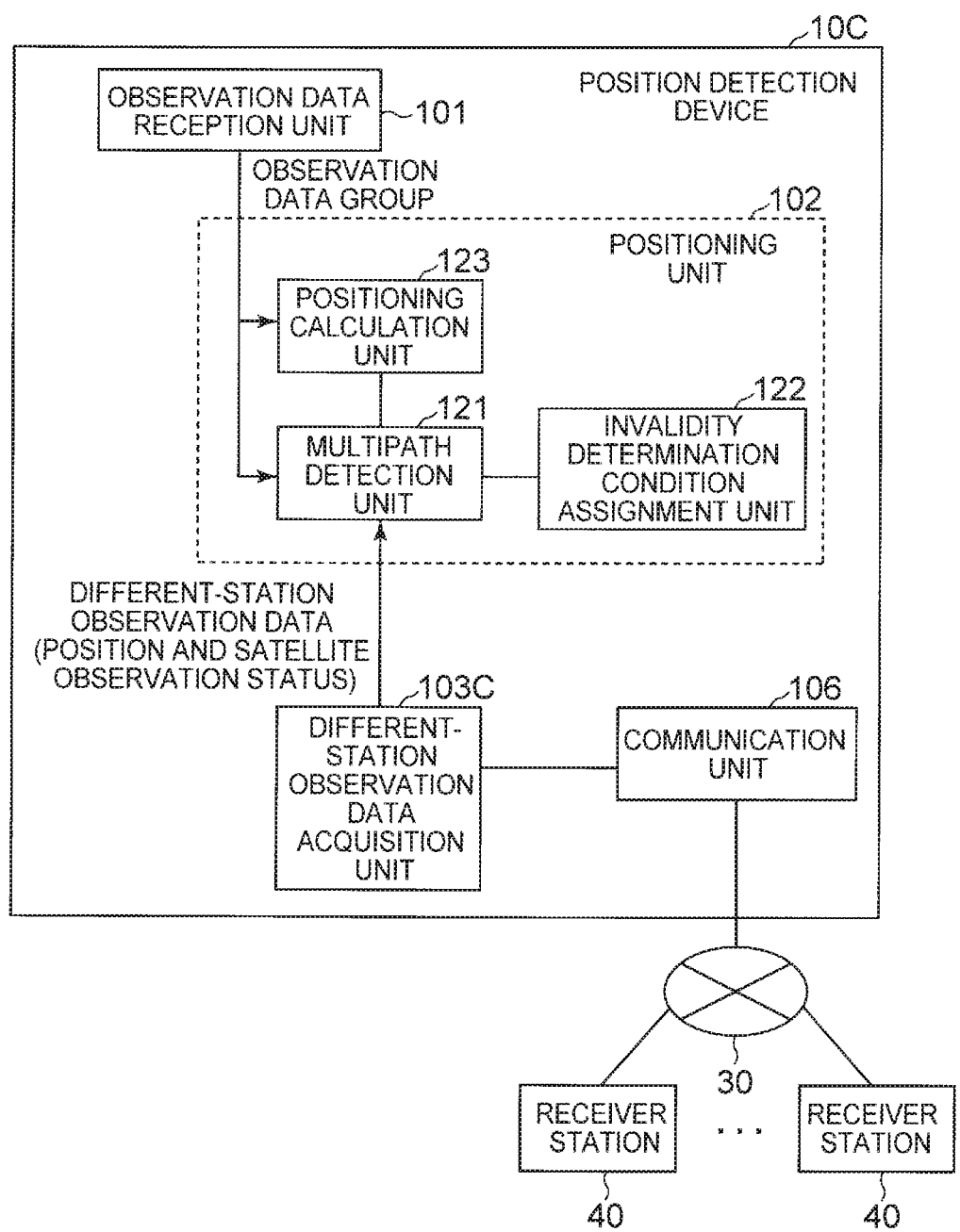
FIG. 14 It depicts a block diagram illustrating a configuration example of a position detection device of a third exemplary embodiment.

FIG. 14 is a block diagram illustrating a configuration example of a position detection device 10C of the third exemplary embodiment. The position detection device 10C illustrated in FIG. 14 is different from the position detection device 10A of the first exemplary embodiment illustrated in FIG. 5 in a point that a different-station observation data acquisition unit 103C is included instead of the image data acquisition unit 103A, and a point that a communication unit 106 is included instead of the imaging unit 104.

In the present example, the different-station observation data acquisition unit 103C corresponds to the external data acquisition unit 13, and the communication unit 106 corresponds to the other-party communication IF 16 in the moving body-side function of the external data system 20 described above.

The communication unit 106 communicates with a different receiver station 40 (hereinafter, referred to as different station) via a communication network 30. The communication unit 106 may communicate with a different moving body (such as vehicle or mobile terminal) as a different station, for example. Also, the communication unit 106 may communicate with a receiver station (such as electronic reference point) other than the moving body as different station, for example. Hereinafter, communication performed between moving bodies may be referred to as vehicle-to-vehicle (V2V) communication. Also, there is a case where communication performed between a moving body and a device other than a moving body is referred to as vehicle-to-everything (V2X) communication.

The different station is not specifically limited as long as being capable of communicating with the own station and having a satellite reception function (GNSS receiver). When an electronic reference point is used as the different station, it is possible to acquire high-quality observation data acquired at a fixed point in a good environment with an open sky. Also, when a mobile terminal is used as the different station, observation data at many points can be acquired.

The different-station observation data acquisition unit 103C communicates with one or more different stations via the communication unit 106 included in the own device, and acquires (receive), from each of the different stations, different-station observation data that is predetermined observation data acquired from a GNSS signal (reception signal) received in the different station. Here, the different-station observation data is not specifically limited as long as the data is acquired by an analysis of a reception signal by the different station. As an example, positional information of the different station, and a pseudo distance to a reception satellite in the different station or information with which the pseudo distance can be identified may be included. In addition, the different-station observation data may include information indicating a satellite observation status in the different station (such as reception signal intensity, multipath determination result, and surrounding environment grasping result).

In the following, a case of acquiring, as different-station observation data, data including positional information indicating a position of a different station, and pseudo distance information indicating a pseudo distance to each reception satellite detected in the different base station (distance between a reception satellite and an own station (in this case, different station) based on propagation time of a reception signal) from the different station will be described as an example. Note that the moving body 1 may mutually exchange the different-station observation data with different stations and share positional information and pseudo distance information. Note that the different-station observation data may have a data structure similar to that of own-station observation data. In that case, the different-station observation data acquisition unit 103C preferably analyzes a different-station observation data group acquired from a certain different station, that is, an observation data group from reception satellites in the different station, and identifies a pseudo distance to each reception satellite or a current position in the different station instead of the positional information and the pseudo distance information described above.

A multipath detection unit 121 of the present exemplary embodiment detects multipath on the basis of an observation data group and different-station observation data including positional information and pseudo distance information of a different station. More specifically, the multipath detection unit 121 of the present exemplary embodiment detects multipath for observation data from each reception satellite by evaluating probability of a pseudo distance to each reception satellite in the own station from a position of a different station and a pseudo distance to each reception satellite which position and distance are indicated by different-station observation data acquired by V2V or V2X communication.

Figure 15:
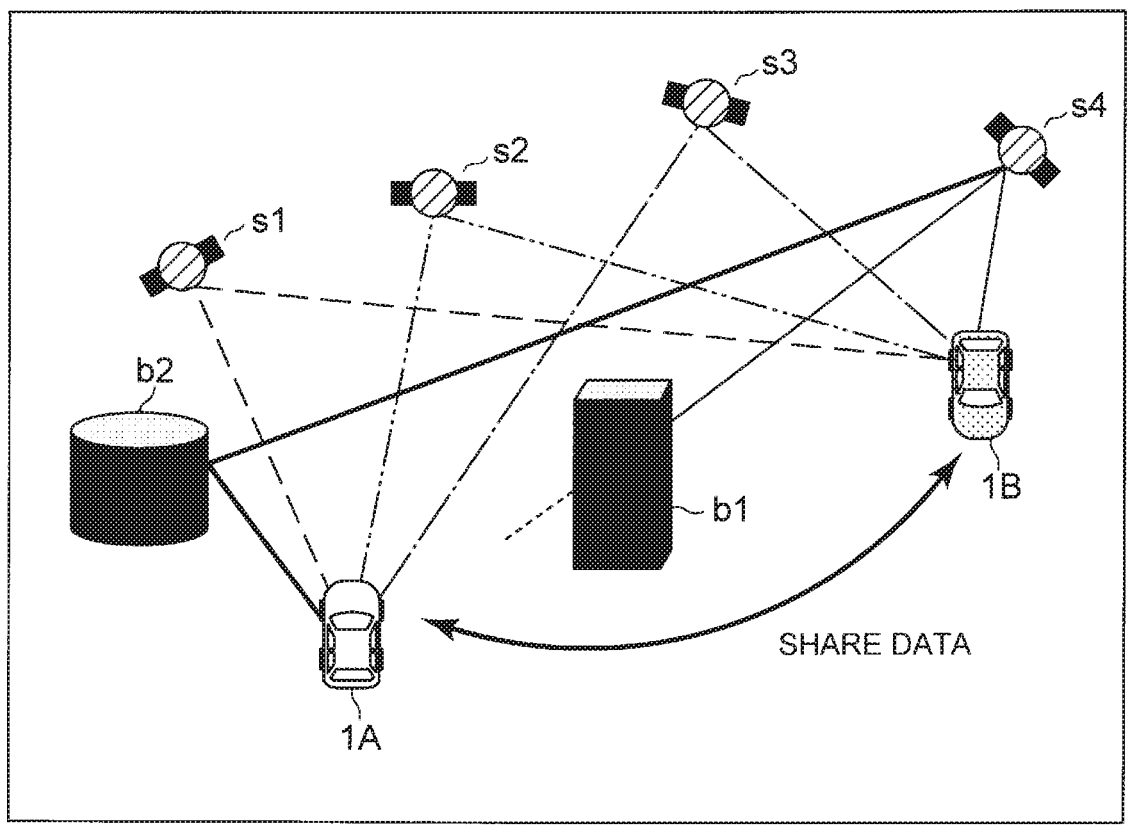
FIG. 15 It depicts a view for describing an outline of a probability evaluation of a pseudo distance to a reception satellite.

FIG. 15 is a view for describing an outline of evaluation of probability of a pseudo distance to a reception satellite. In FIG. 15, an example in which a moving body 1A and a moving body 1B share, as different-station observation data, positional information and pseudo distance information of own stations which pieces of information are acquired on the basis of observation data from four satellites 2 (s1 to s4) is illustrated. As a result, as illustrated in FIG. 15, in the moving body 1A, multipath is detected with respect to observation data from the reception satellite s4.

FIG. 16 is a view for describing an example of multipath detection method based on positional information and pseudo distance information of a different station. The multipath detection unit 121 may determine whether observation data from a satellite to be determined (reception satellite s1, in the present example) is multipath by using positional information and pseudo distance information of a different station v1 in the following manner.

First, a distance Da between the moving body 1 that is the own station and the different station v1 from which different-station observation data is acquired is calculated on the basis of positional information of each (see FIG. 16(a)).

Then, an angle α formed by a vector from the different station v1 to the satellite to be determined and a vector from the different station v1 to the own station is calculated, and a distance De between the own station and the satellite to be determined is calculated on the basis of a result thereof (FIG. 16(a)).

Finally, the calculated distance De is compared with a distance (pseudo distance) Dz to a satellite to be determined which distance is identified on the basis of a reception signal from the satellite to be determined, and it is determined whether there is multipath on the basis of the difference |Dz−De| (FIG. 16(b)). As illustrated in FIG. 16(b), in a case where there is a blocking object between the own station and the satellite to be determined, there is a high possibility that Dz>De. Thus, the multipath detection unit 121 may determine that there is no multipath when the difference |Dz−De| is equal to or smaller than a predetermined threshold, and may determine that there is multipath when the predetermined threshold is exceeded. In the following, there is a case where the difference is referred to as a pseudo distance difference Dff. In the following, multipath is determined with the difference being regarded as an error amount in a pseudo distance (estimation distance) identified by the own station which error amount is identified on the basis of different-station observation data.

Note that when there is only one different station from which different-station observation data is acquired, in a case where multipath is also included in observation data used for calculation of a distance to a satellite to be determined in the different station, accurate determination cannot be made. Thus, it is preferable that there is a plurality of different stations from which different-station observation data is acquired, or that the different station is an electronic reference point in an environment where multipath is not generated. However, when a distance to the different station is too long, there is a possibility that an influence difference of a different error factor or an error in calculation of a distance Da becomes large. Thus, a different station from which different-station observation data is acquired is preferably not too far.

Also, the invalidity determination condition assignment unit 122 of the present exemplary embodiment assigns an invalidity determination condition at least to observation data determined to be multipath to be multipath on the basis of a multipath detection result by the multipath detection unit 121 and a pseudo distance difference of each reception satellite which difference is calculated at detection of the multipath. For example, the invalidity determination condition assignment unit 122 may identify exclusion priority of pieces of observation data in such a manner that the exclusion priority becomes higher as a pseudo distance difference of each reception satellite becomes larger.

FIG. 17 is a view for describing an example of a multipath detection result and exclusion priority based on a pseudo distance difference. In the example illustrated in FIG. 17, with respect to each of four satellites (s1 to s4), a multipath detection result and exclusion priority based on a pseudo distance difference are illustrated. Note that a threshold of the pseudo distance difference in the present example is 6 m. In the present example, since a pseudo distance difference s1Dff=5 m and is equal to or shorter than the threshold, the reception satellite s1 is determined to have no multipath. Since pseudo distance differences (s2Dff, s3Dff, and s4Dff)

are respectively 30 m, 14 m, and 7 m and exceed the threshold, the other reception satellites s2 to s4 are determined to have multipath.

Also, in FIG. 17, it is indicated that the exclusion priority is identified as s2→s3→s4→s1 since a magnitude relationship of the pseudo distance differences between the reception satellites is s1<s4<s3<s2. Note that the above expresses that s2 is the most likely to be excluded and s1 is the least likely to be excluded.

A positioning calculation unit 123 of the present exemplary embodiment calculates an own device position on the basis of an observation data group (observation data from each reception satellite) acquired by an observation data reception unit 101. Also, in a case where a multipath detection result is acquired from the multipath detection unit 121, the positioning calculation unit 123 calculates a position of the own device on the basis of the observation data group and the multipath detection result (including invalidity determination condition).

Note that, also in the present exemplary embodiment, the positioning calculation unit 123 may determine a satellite to be used or a satellite to be excluded on the basis of not only an invalidity determination condition assigned to the multipath detection result (determination condition based on a pseudo distance difference of a reception satellite, in the present exemplary embodiment) but also the number of satellites on which positioning calculation can be performed or validity of an arrangement of each reception satellite. A method of determining a satellite to be used or a satellite to be excluded based on these may be basically similar to that in the first exemplary embodiment. However, in the present exemplary embodiment, (3) a blocked degree described above is read as (3) a pseudo distance difference.

Next, an operation of the present exemplary embodiment will be described. FIG. 18 is a sequence diagram illustrating an operation example of the position detection device 10C of the present exemplary embodiment. Note that the position detection device 10C of the present exemplary embodiment is basically similar to the position detection device 10A of the first exemplary embodiment and the position detection device 10B of the second exemplary embodiment. However, contents of processing of acquiring external data, processing of detecting multipath on the basis of the acquired external data, and processing of receiving a multipath detection result and assigning an invalidity determination condition are different.

In the example illustrated in FIG. 18, the observation data reception unit 101 first receives a GNSS signal of each satellite 2 and acquires observation data (Step S201). The acquired observation data group is input to a positioning unit 102. (more specifically, multipath detection unit 121 and positioning calculation unit 123).

Next, the positioning calculation unit 123 performs positioning calculation based on the observation data group with the observation data group as an input (Step S202C), A positioning position acquired as a result of the positioning calculation is input to the map data acquisition unit 103B. Here, positional information of the reception satellite may be input together to the map data acquisition unit 103B. Note that, also in the present example, the positioning calculation unit 123 (or different processing unit) may perform processing of estimating the latest oval device position from the latest positioning position instead of the positioning calculation in Step S202C.

Also, when a position of the own station is input, the different-station observation data acquisition unit 103C communicates with one or more different stations and acquires (acquire) observation data in the different stations (different-station observation data) (Step S203C). Here, the different-station observation data acquisition unit 103C may determine existence/non-existence of communication, a communication partner, or the number thereof according to a distance between the own station and a different station, signal intensity of a wireless signal used in the communication, a status of surrounding environment grasping acquired by a combination with a different means, and the like (Step S204C). The amount of communication is reduced by addition of such determination processing. The different-station observation data acquired by the different-station observation data acquisition unit 103C is input to the positioning unit 102 (more specifically, multipath detection unit 121) as an analysis result of surrounding environment grasping in the different station.

When the observation data group and one or more pieces of different-station observation data are input, the multipath detection unit 121 detects multipath in the observation data group on the basis of the observation data group and the different-station observation data (Step S205C). Also, here, the invalidity determination condition assignment unit 122 assigns an invalidity determination condition to a multipath detection result on the basis of the multipath detection result and an external data analysis result used for detection of the multipath.

A flow of subsequent processing may be similar to that in and after Step S2059 of the second exemplary embodiment.

As described above, according to the present exemplary embodiment, by using observation data in different receiver stations, it is possible not only to grasp a wider range of environment but also to easily expand an application range of the data depending on contents of exchanged data, whereby the multipath can be detected more accurately. As a result, a current position of a moving body can be detected more accurately.

Fourth Exemplary Embodiment

FIG. 19 is a block diagram illustrating a configuration example of a position detection device 101) of the fourth exemplary embodiment. The position detection device 101) illustrated in FIG. 19 is an example in which the position detection device 10A to the position detection device 10C of the above exemplary embodiments are combined.

In the present exemplary embodiment, a multipath detection unit 121 detects multipath of observation data of the own station on the basis of an observation data group received by an observation data reception unit 101, a blocked range based on image data acquired by an image data acquisition unit 103A, a blocked range based on map data acquired by a map data acquisition unit 103B, and a different-station observation data group acquired by a different-station observation data acquisition unit 103C.

For example, the multipath detection unit 121 may perform both of multipath determination using the blocked ranges identified from the image data and the map data, and multipath determination using a pseudo distance difference calculated on the basis of the different-station observation data, and detect multipath from a result thereof. For example, the multipath detection unit 121 may determine, as multipath, what is determined to be multipath by any one of the methods.

Also, the invalidity determination condition assignment unit 122 may assign an invalidity determination condition to a multipath detection result on the basis of a blocked degree identified on the basis of the blocked range identified from the image data and the map data, and the pseudo distance difference identified from the different-station observation data.

FIG. 20 is a view for describing an example of an exclusion priority assignment result by the invalidity determination condition assignment unit 122 of the present exemplary embodiment. As illustrated in FIG. 20, the invalidity determination condition assignment unit 122 may score a degree of invalidity (here, certainty factor of not being multipath) of each piece of observation data on the basis of the blocked degree and the pseudo distance difference, and may assign an invalidity determination condition on the basis of the score (invalidity determination score).

Note that in FIG. 20(a), positions of four satellites (s1 to s4) that are the reception satellites identified from the observation data of the present example are illustrated. Also, in FIG. 20(b), blocked ranges due to three blocking objects (b1 to b3) that are blocking objects identified from the image data and the map data of the present example are illustrated. A position N (si$\theta$, si$\varphi$) of each reception satellite si and a blocked range Rj ((bj$\theta_{min}$, bj$\theta_{max}$), (bj$\varphi_{min}$, bj$\varphi_{max}$)) due to a blocking object bj in the present example are as follows.

Position P1 of reception satellite s1=(185, 38)
Position P2 of reception satellite s2=(43, 85)
Position P3 of reception satellite s3=(300, 67)
Position P4 of reception satellite s4=(277, 65)
Blocked range R1 due to blocking object b1=((180, 190), (0, 65))
Blocked range R2 due to blocking object b2=((45, 80), (0, 50))
Blocked range R3 due to blocking object b2=((270, 320), (0, 70))

Also, in FIG. 20(c), a pseudo distance difference of each reception satellite identified from the different-station observation data of the present example is illustrated. A pseudo distance difference siDff of each reception satellite si in the present example is as follows.

Pseudo distance difference s1Dff of reception satellite s1=65
Pseudo distance difference s2Dff of reception satellite s2=5
Pseudo distance difference s3Dff of reception satellite s3=35
Pseudo distance difference s4Dff of reception satellite s4=20

According to the above, an example of a result of blocked degree scoring and an example of a result of pseudo distance difference scoring are illustrated in FIG. 20(d).

Scoring of the blocked degree may be performed, for example, by utilization of the following expressions (2) and (3) for each of an azimuth angle $\theta$ and an elevation angle $\varphi$. Here, i=1 to 4 and j=1 to 3. Note that the expression (2) indicates that an azimuth angle of a satellite is 0 when not being included in a blocked range by any of the blocking objects, and is counted up to 10° with a degree of overlap 1°=1 when being included in a blocked range by any of the blocking objects. Note that in the expression (3), an azimuth angle is read as an elevation angle.

(Scoring of Azimuth Angle $\theta$)
If si$\theta$>bj$\theta_{max}$ or bj$\theta_{min}$>si$\theta$, $\theta$score=0

If bj$\theta_{max}$>si$\theta$>bj$\theta_{min}$, $\theta$score=min(bj$\theta_{max}$-si$\theta$, si$\theta$-bj$\theta_{min}$, 10)  (2)

(Scoring of Elevation Angle $\varphi$)
If si$\varphi$>bj$\varphi_{max}$ or bj$\varphi_{min}$>si$\varphi$, $\varphi$score=0 if bj$\theta_{max}$>si$\varphi$>bj$\varphi_{min}$, $\varphi$score=min(bj$\varphi_{max}$-si$\theta$, si$\theta$-bj$\varphi_{min}$, 10)  (3)

Also, the scoring of a pseudo distance difference may be performed, for example, by utilization of the following expression (4). Here, i=1 to 4, Also, thDff is a threshold of the pseudo distance difference, and is 50 [m] in the present example. Note that the expression (4) indicates that a difference value is scored in a scale of 1/10 of a threshold when a pseudo distance difference of a satellite is equal to or smaller than the threshold, and is set to the maximum value 10 when the threshold is exceeded. Note that in the present example, all of maximum values of a $\varphi$ score, the $\varphi$ score, and a Dff score are set to 10.

(Scoring of Pseudo Distance Difference Dff)
If siDff≤thDff,

Dff score=siDff/thDff×10

If siDff>thDff,

Dff score=10  (4)

The following is a $\theta$ score, $\varphi$ score, and Dff score of each reception satellite in the present example.
s1: $\theta$ score=5, $\varphi$ score 10, and Dff score=10
s2: $\theta$ score=0, $\varphi$ score 0, and Dff score=1
s3: $\theta$ score=10, $\varphi$ score 0, and Dff score=7
s4: $\theta$ score=7, $\varphi$ score 5, and Dff score=4

Invalidity determination score=$\theta$ score+$\varphi$ score+Dff score  (5)

In FIG. 20(e), an invalidity determination score, a multipath determination result, and exclusion priority of each reception satellite in the present example are illustrated. Note that the invalidity determination score is calculated by utilization of the following expression (5). In the example illustrated in FIG. 20(e), since it is indicated by an analysis result of image data that the reception satellite s1 has a blocked relationship with a certain blocking object, it is determined that there is multipath. Also, the reception satellite s2 is not included in a blocked range by any blocking object indicated by an analysis result of image data and an analysis result of map data, and a pseudo distance difference is within a threshold. Thus, it is determined that there is no multipath. Also, since it is indicated by an analysis result of image data and map data that the reception satellite s3 has a blocked relationship with a certain blocking object, it is determined that there is multipath. Also, it is determined that there is multipath since it is indicated by an analysis result of map data that the reception satellite s4 has a blocked relationship with a certain blocking object although a pseudo distance difference does not exceed a threshold.

Furthermore, in the present example, since a magnitude relationship between invalidity determination scores of the reception satellites is s1>s3>s4>s2, exclusion priority is identified as s3→s4→s2.

Note that the invalidity determination score can also be calculated by the multipath detection unit 121.

A positioning calculation unit 123 of the present exemplary embodiment calculates an own device position on the basis of an observation data group (observation data from each reception satellite) acquired by an observation data reception unit 101. Also, in a case where a multipath detection result is acquired from the multipath detection unit 121, the positioning calculation unit 123 calculates a position of the own device on the basis of the observation data group and the multipath detection result (including invalidity determination condition).

Also in the present exemplary embodiment, the positioning calculation unit 123 may determine a satellite to be used or a satellite to be excluded on the basis of not only an invalidity determination condition assigned to the multipath detection result (exclusion priority based on an invalidity determination score, in the present exemplary embodiment) but also the number of satellites on which positioning calculation can be performed or validity of an arrangement of each reception satellite. A method of determining a satellite to be used or a satellite to be excluded based on these may be basically similar to that in the first exemplary embodiment. However, in the present exemplary embodiment, (3) a blocked degree described above is read as (3) an exclusion priority.

Figure 21:
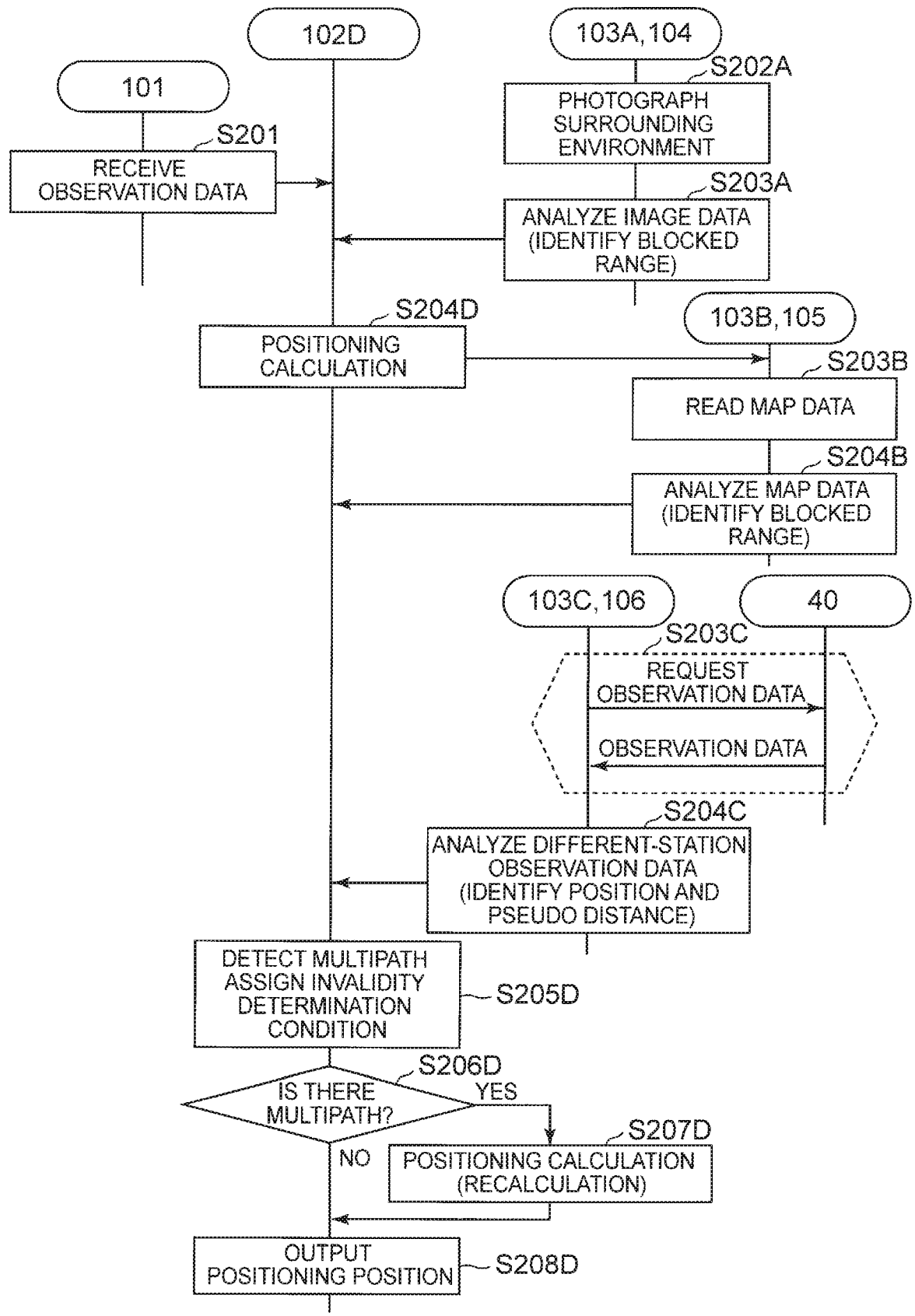
FIG. 21 It depicts a sequence diagram illustrating an operation example of the position detection device of the fourth exemplary embodiment.

Next, an operation of the present exemplary embodiment will be described. FIG. 21 is a sequence diagram illustrating an operation example of the position detection device 10D of the present exemplary embodiment.

In the example illustrated in FIG. 21, the observation data reception unit 101 receives a GNSS signal of each satellite 2 and acquires observation data (Step S201). The acquired observation data group is input to a positioning unit 102 (more specifically, multipath detection unit 121 and positioning calculation unit 123).

Also in the present example, the imaging unit 104 acquires image data of a surrounding environment of the own device according to an instruction from the image data acquisition unit 103A (Step S202A). The acquired image data is input to the image data acquisition unit 103A.

When the image data is input, the image data acquisition unit 103A analyzes the image data and identifies a blocked range in the own device (Step S203A). The identified blocked range is output to the positioning unit 102 (more specifically, multipath detection unit 121) as an analysis result based on the image data.

Also, the positioning calculation unit 123 to which an observation data group is input performs positioning calculation based on the observation data group (Step S204D). A positioning position acquired as a result of the positioning calculation is output to the map data acquisition unit 103B and the different-station observation data acquisition unit 103C. Here, positional information of the reception satellite may be input together.

Note that the positioning calculation unit 123 (or different processing unit) may perform processing of estimating the latest own device position from the latest positioning position instead of the positioning calculation in Step S204D. In that case, the latest own device position may be estimated from a positioning position on which a previous multipath detection result is reflected.

Also, when a position of the own station is input, the map data acquisition unit 103B acquires information of a certain ground surface object around the own device from the map data storage unit 105 (Step S203B: reading of map data). Then, the map data acquisition unit 103B analyzes the read information and identifies a blocked range in the own device (Step S204B). The identified blocked range is input to the positioning unit 102 (more specifically, multipath detection unit 121) as an analysis result based on the map data.

Also, when a position of the own station is input, the different-station observation data acquisition unit 103C communicates with one or more different stations and acquires (acquire) observation data in the different stations (different-station observation data) (Step S203C). The different-station observation data acquired by the different-station observation data acquisition unit 103C is input to the positioning unit 102 (more specifically, multipath detection unit 121) as an analysis result of surrounding environment grasping in the different station (Step S204C).

Next, when an observation data group of the own station, a blocked range based on the image data, a blocked range based on the map data, and the different-station observation data are input, the multipath detection unit 121 detects multipath in the observation data group on the basis of these (Step S205D). Also, here, the invalidity determination condition assignment unit 122 assigns an invalidity determination condition to a multipath detection result on the basis of the multipath detection result and an external data analysis result used for detection of the multipath.

Note that a flow of subsequent processing is similar to that in and after Step S205B of the second exemplary embodiment.

As described above, according to the present exemplary embodiment, analysis results based on pieces of external data acquired by the three methods can be used. Thus, multipath can be detected more accurately. As a result, a current position of a moving body can be detected more accurately.

Also, in the above, an example in which the analysis results based on the pieces of external data acquired by the three methods are used in detection of multipath and assignment of exclusion priority has been described. However, a usage method of the pieces of external data based on the three methods is not limited to this.

For example, a target of V2V communication may be selected by utilization of an invalidity determination score (=θ score+φ score) acquired from an azimuth angle score (θ score) and an elevation angle score (φ score) of each reception satellite based on image data or map data. For example, in a case where there is a reception satellite with a low invalidity determination score in the own station, a different station with a high invalidity determination score for the reception satellite may be searched for or identified by inquiry or the like, and observation data related to the reception satellite may be received from the different station. In such a manner, by selecting a partner, from which different-station observation data is acquired, on the basis of surrounding environments (blocked degree) of each other, it is possible to prevent a pseudo distance difference front being evaluated between stations having poor reception environments. In addition, a useless communication load can be prevented.

Also, although an example of using all three methods has been described above, it is also possible to perform similar processing by combining any two of the three methods. For example, by combining surrounding environment grasping according to image data and surrounding environment grasping according to map data, it is possible to use information of a ground surface object in a wide range front the map data and real-time information of the ground surface object from the image data. Thus, it is possible to grasp the surrounding environment more accurately.

Also, for example, by combining surrounding environment grasping according to image data and surrounding environment grasping according to different station communication, it is possible to realize more accurate surrounding environment grasping while reducing an unnecessary communication load by selecting a communication partner on the basis of a surrounding environment grasping result according to the image data. Also, it is possible to detect multipath more accurately by performing the detection of multipath on the basis of analysis results in different viewpoints that are a blocked degree and a pseudo distance difference. Note that the same applies to a case where map data is used instead of image data.

Also, in a case where all three methods are combined, it is possible to realize more accurate surrounding environment grasping while reducing an unnecessary communication load, and to detect multipath more accurately.

Note that in the present invention, a kind or the like of a moving body is not specifically limited as long as a purpose is to detect a position of a moving body a position of which is not fixed. In the above, a vehicle is exemplified as a moving body. However, it is also possible to detect a position of a person, for example, by using a GNSS receiver of a mobile terminal held by the person. In such a case, for example, map data on a network can be used as map data. Also, it is also possible to use a communication means such as LTE as a means of realizing V2V or V2X.

Also, as described above, a position detection method of the present invention can be completed within a moving body 1, or processing can be distributed by utilization of network resources such as a server. In addition, as a mode of using a server and the like, scores or pieces of observation data of each moving body for each reception satellite may be aggregated. In that case, each moving body may select and acquire, as different-station observation data, the most suitable information from pieces of information aggregated in the server. At that time, the moving body may transmit observation data of the own station to the server, and calculation of a pseudo distance difference, or detection of multipath or assignment of exclusion priority based on the pseudo distance difference can be performed in the server.

Figure 22:
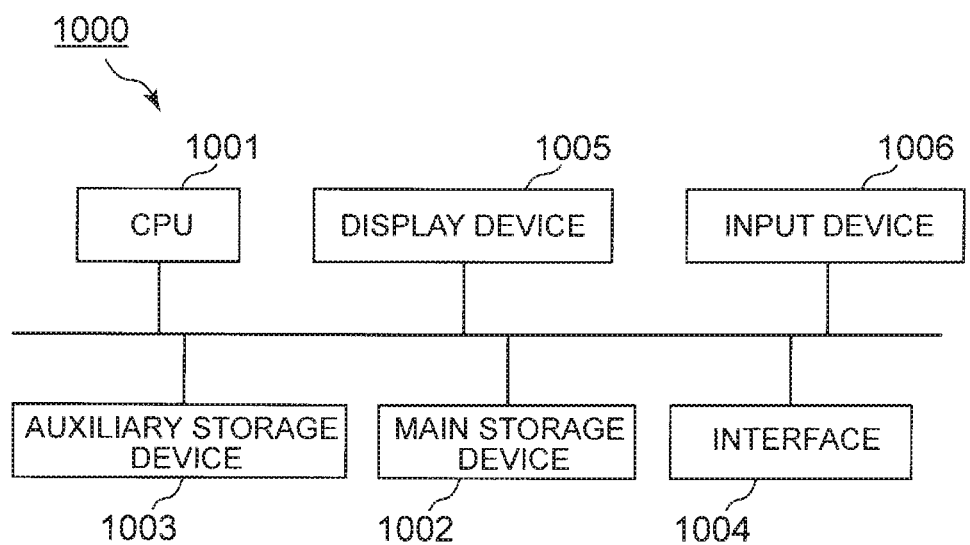
FIG. 22 It depicts a schematic block diagram illustrating a configuration example of a computer according to each exemplary embodiment of the present invention.

Also, FIG. 22 is a schematic block diagram illustrating a configuration example of a computer according to each exemplary embodiment of the present invention. A computer 1000 includes a CPU 1001, a main storage device 1002, an auxiliary storage device 1003, an interface 1004, a display device 1005, and an input device 1006.

A position detection device of each exemplary embodiment described above, or a server, a different device, and the like included in a satellite positioning system may be mounted in the computer 1000. In that case, an operation of each device may be stored in the auxiliary storage device 1003 in a form of a program. The CPU 1001 reads the program from the auxiliary storage device 1003, expands the program in the main storage device 1002, and performs predetermined processing in each exemplary embodiment according to the program. Note that the CPU 1001 is an example of an information processing device that operates according to the program. In addition to the central processing unit (CPU), a micro processing unit (MPU), a memory control unit (MCU), a graphics processing unit (GPU), or the like may be included, for example.

The auxiliary storage device 1003 is an example of a non-transitory tangible medium. Other examples of a non-transitory tangible medium include a magnetic disk, a magneto-optical disk, a CD-ROM, a DVD-ROM, a semiconductor memory, and the like connected through the interface 1004. Also, in a case where this program is distributed to the computer 1000 through a communication line, the computer 1000 that receives the distribution may expand the program in the main storage device 1002 and execute predetermined processing in each exemplary embodiment.

Also, the program may be to realize a part of predetermined processing in each exemplary embodiment. Moreover, the program may be a difference program that realizes predetermined processing in each exemplary embodiment in combination with a different program already stored in the auxiliary storage device 1003.

The interface 1004 transmits/receives information to/from a different device. Also, the display device 1005 presents information to a user. Also, the input device 1006 receives an input of information from the user.

Also, depending on processing contents in an exemplary embodiment, a part of elements of the computer 1000 can be omitted. For example, when the computer 1000 does not present information to a user, the display device 1005 can be omitted. For example, when the computer 1000 does not receive an information input from a user, the input device 1006 can be omitted.

Also, a part or whole of each component of each of the above exemplary embodiments is performed by general-purpose or dedicated circuitry, processor, or the like or a combination thereof. These may be configured by a single chip or may be configured by a plurality of chips connected through a bus. Also, a part or whole of each component of each of the above exemplary embodiments may be realized by a combination of the above-described circuitry or the like with the program.

In a case where a part or whole of each component of each of the above exemplary embodiments is realized by a plurality of information-processing devices, circuitry, and the like, the plurality of information processing devices, circuitry, and the like may be collectively arranged or dispersedly arranged. For example, the information processing devices, circuitry, and the like may be realized in a form of being connected through a communication network, the form being a client and server system or a cloud computing system, for example.

Figure 23:
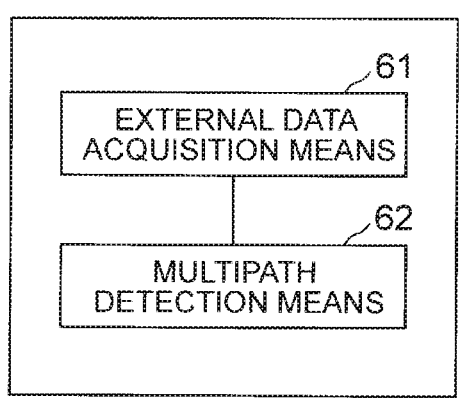
FIG. 23 It depicts a block diagram illustrating an outline of a multipath detection device of the present invention.

Next, an outline of the present invention will be described. FIG. 23 is a block diagram illustrating an outline of a multipath detection device of the present invention. The multipath detection device illustrated in FIG. 23 includes an external data acquisition means 61 and a multipath detection means 62.

The external data acquisition means 61 (such as external data acquisition unit 13, image data acquisition unit 103A, map data acquisition unit 1039, or different-station observation data acquisition unit 103C) acquires external data that is predetermined data other than observation data acquired from a GNSS signal received by a GNSS receiver included in a moving body.

The multipath detection means 62 (such as multipath detection unit 121) detects multipath by determination whether observation data is multipath on the basis of a blocked range with respect to a GNSS signal in a moving body or an observation status of the GNSS signal in a different station that is a receiver station other than the moving body, the blocked range or the observation status being acquired by an analysis of external data.

With such a configuration, it is possible to detect multipath highly accurately with respect to observation data observed by a moving body.

Figure 24:
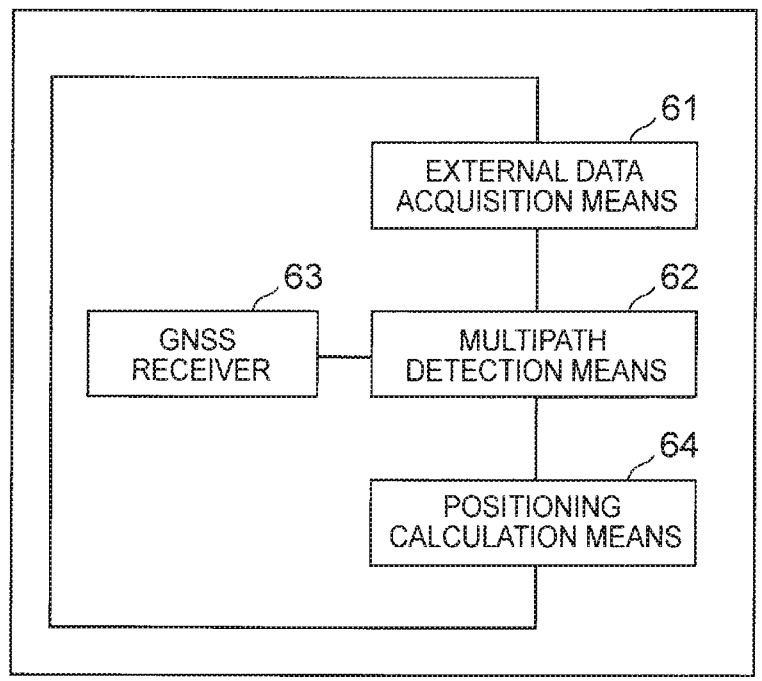
FIG. 24 It depicts a block diagram illustrating an outline of a moving body positioning system of the present invention.
Figure 25:
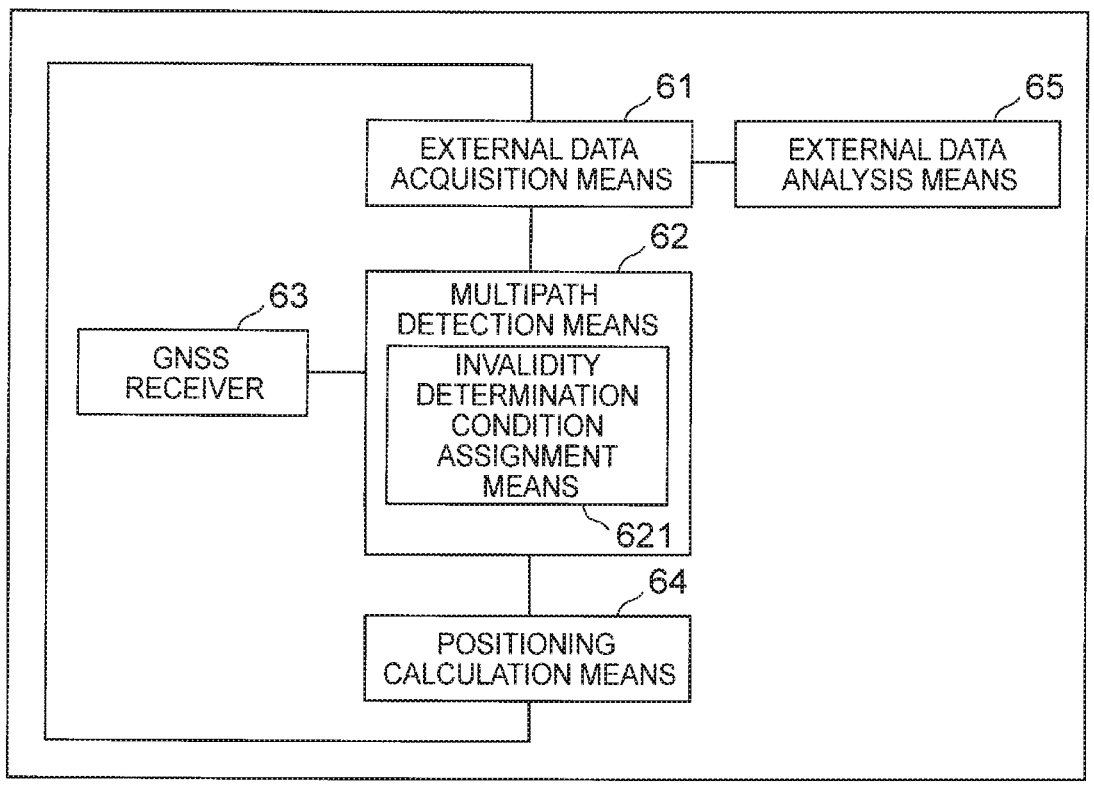
FIG. 25 It depicts a block diagram illustrating a different example of a moving body positioning system of the present invention.

Also, FIG. 24 is a block diagram illustrating an outline of a moving body positioning system of the present invention. The moving body positioning system illustrated in FIG. 24 further includes a GNSS receiver 63 and a positioning calculation means 64 in addition to the external data acquisition means 61 and the multipath detection means 62 described above. Note that as illustrated in FIG. 25, an invalidity determination condition assignment means 621 and an external data analysis means 65 may be further included. FIG. 25 is a block diagram illustrating a different example of a moving body positioning system of the present invention.

A GNSS receiver 63 (such as GNSS receiver 11, or observation data reception unit 101) is provided in a moving body, receives a GNSS signal transmitted from each of one or more satellites, and acquires observation data corresponding to each satellite.

A positioning calculation means 64 (such as positioning unit 12 or positioning calculation unit 123) performs positioning calculation after selecting a satellite to be used or a satellite to be excluded on the basis of a multipath detection result by a multipath detection means 62.

An invalidity determination condition assignment means 621 (such as invalidity determination condition assignment unit 122) assigns, at least to observation data included in an observation data group and determined to be multipath, a predetermined index to be a determination condition for invalidity of the observation data.

An external data analysis means 65 (such as external data acquisition unit 13, image data acquisition unit 103A, or a part of map data acquisition unit 103B or a part of the different-station observation data acquisition unit 1030) analyzes external data, and identifies a blocked range with respect to a GNSS signal in a moving body or an observation status of a GNSS signal in a different station that is a receiver station other than the moving body.

With such a configuration, it is possible to detect multipath highly accurately even with respect to observation data observed by a moving body that cannot always acquire highly accurate positional information or the latest map data. As a result, an own device position of the moving body can be detected highly accurately.

Note that the above exemplary embodiments can be described in a manner of the following supplementary notes, but is not limited to the following configurations.

(Supplementary note 1) A moving body positioning system including: a GNSS receiver that is included in a moving body and that receives a GNSS signal transmitted from each of one or more satellites and acquires observation data corresponding to each of the satellites; an external data acquisition means that acquires external data that is predetermined data other than the observation data; a multipath detection means that detects multipath with respect to an observation data group that is a set of pieces of observation data used for positioning calculation to identify a position of the moving body and that is a set of pieces of observation data respectively acquired from the GNSS signals of the one or more satellites; and a positioning calculation means that performs positioning calculation after selection of a satellite to be used and a satellite to be excluded on the basis of a result of the multipath detection, wherein the multipath detection means detects multipath by determining whether the observation data is multipath on the basis of a blocked range with respect to the GNSS signals in the moving body or an observation status of the GNSS signals in a different station that is a receiver station other than the moving body, the blocked range or the observation status being acquired from an analysis of the external data.

(Supplementary note 2) The moving body positioning system according to supplementary note 1, wherein the multipath detection means includes an invalidity determination condition assignment means that assigns, to at least observation data included in the observation data group and determined to be multipath, a predetermined index to be a determination condition for invalidity of the observation data.

(Supplementary note 3) The moving body positioning system according to supplementary note 1 or supplementary note 2, wherein the external data is at least any one of image data photographed by a camera device included in the moving body, three-dimensional map data within a predetermined range around the moving body, and different-station observation data indicating the observation status of the GNSS signals in the different station.

(Supplementary note 4) The moving body positioning system according to any one of supplementary note 1 to supplementary note 3, further including an external data analysis means that analyzes the external data and identifies the blocked range with respect to the GNSS signals in the moving body or the observation status of the GNSS signals in the different station that is the receiver station other than the moving body.

(Supplementary Note 5) The moving body positioning system according to supplementary note 3 or supplementary note 4, wherein the external data acquisition means acquires at least image data acquired by photographing of a surrounding environment of the moving body with a camera device included in the moving body, and the multipath detection means detects multipath by determining whether the observation data is multipath on the basis of the blocked range identified on the basis of a position and a size of a ground surface object, which is captured in the image data and acquired by an analysis of the image data, and a position of the moving body.

(Supplementary note 6) The moving body positioning system according to supplementary note 5, wherein the external data acquisition means acquires time-series image data photographed by the camera device included in the moving body.

(Supplementary note 7) The moving body positioning system according to any one of supplementary note 3 to supplementary note 6, wherein the external data acquisition means acquires at least three-dimensional map data within a predetermined range around the moving body which range is identified by a latest position of the moving body, and the multipath detection means detects multipath by determining whether the observation data is multipath on the basis of the blocked range identified on the basis of a position and a size of a ground surface object existing around the moving body, which position and size are indicated by the three-dimensional map data and are acquired by an analysis of the three-dimensional map data, and the latest position of the moving body.

(Supplementary note 8) The moving body positioning system according to any one of supplementary note 3 to supplementary note 7, wherein the external data acquisition means communicates with the different station and acquires the different-station observation data, and the multipath detection means detects multipath by determining whether the observation data is multipath on the basis of an error amount in an estimation distance between the moving body and a satellite that is a transmitter station of a GNSS signal which error amount is identified on the basis of an estimation distance between the different station and the satellite, which distance is acquired by an analysis of the different-station observation data, and a distance between the different station and the moving body.

(Supplementary note 9) The moving body positioning system according to any one of supplementary note 1 to supplementary note 8, wherein the external data acquisition means acquires at least two or more kinds of external data among image data photographed by a camera device included in the moving body, three-dimensional map data within a predetermined range around the moving body, and different-station observation data indicating the observation status of the GNSS signals in the different station.

(Supplementary note 10) A multipath detection device including: an external data acquisition means that acquires external data that is predetermined data other than observation data acquired from a GNSS signal received by a GNSS receiver included in a moving body; and a multipath detection means that detects multipath by determining whether the observation data is multipath on the basis of a blocked range with respect to the GNSS signal in the moving body or an observation status of the GNSS signal in a different station that is a receiver station other than the moving body, the blocked range or the observation status being acquired by an analysis of the external data.

(Supplementary note 11) The multipath detection device according to supplementary note 10, further including an invalidity determination condition assignment means that assigns, to at least observation data determined to be multipath, a predetermined index to be a determination condition for invalidity of the observation data on the basis of information used for the detection of multipath.

(Supplementary note 12) A multipath determination method including: acquiring external data that is predetermined data other than observation data acquired from a GNSS signal received by a GNSS receiver included in a moving body; and detecting multipath by determining whether the observation data is multipath on the basis of a blocked range with respect to the GNSS signal in the moving body or an observation status of the GNSS signal in a different station that is a receiver station other than the moving body, the blocked range or the observation status being acquired by an analysis of the external data, acquiring external data and detecting multipath being performed by an information processing device.

(Supplementary note 13) A moving body positioning method including: acquiring observation data that is acquired from a GNSS signal transmitted from each of one or more satellites and received by a GNSS receiver included in a moving body and that is observation data corresponding to each of the satellites; acquiring external data that is predetermined data other than the observation data; detecting multipath, with respect to an observation data group that is a set of pieces of the observation data respectively corresponding to the satellites, by determining whether each piece of the observation data in the observation data group is multipath on the basis of a blocked range with respect to the GNSS signals in the moving body or an observation status of the GNSS signals in a different station that is a receiver station other than the moving body, the blocked range or the observation status being acquired by an analysis of the external data; and performing positioning calculation after selection of a satellite to be used or a satellite to be excluded on the basis of a result of the multipath detection, acquiring observation data, acquiring external data, detecting multipath, and performing position calculation being performed by an information processing device.

(Supplementary note 14) A multipath determination program causing a computer to execute processing of acquiring external data that is predetermined data other than observation data acquired from a GNSS signal received by a GNSS receiver included in a moving body, and processing of determining whether the observation data is multipath on the basis of a blocked range with respect to the GNSS signal in the moving body or an observation status of the GNSS signal in a different station that is a receiver station other than the moving body, the blocked range or the observation status being acquired by an analysis of the external data.

(Supplementary note 15) A moving body positioning program causing a computer to execute processing of acquiring observation data that is acquired from a GNSS signal transmitted from each of one or more satellites and received by a GNSS receiver included in a moving body and that is observation data corresponding to each of the satellites, processing of acquiring external data that is predetermined data other than the observation data, processing of detecting multipath, with respect to an observation data group that is a set of pieces of the observation data respectively corresponding to the satellites, by determining whether each piece of the observation data in the observation data group is multipath on the basis of a blocked range with respect to the GNSS signals in the moving body or an observation status of the GNSS signals in a different station that is a receiver station other than the moving body, the blocked range or the observation status being acquired by an analysis of the external data, and processing of performing positioning calculation after selection of a satellite to be used and a satellite to be excluded on the basis of a result of the multipath detection.

Although the present invention has been described with reference to the present exemplary embodiments and examples, the present invention is not limited to the above exemplary embodiments and examples. Various modifications that can be understood by those skilled in the art can be made within the scope of the present invention with respect to a configuration or a detail of the present invention.

This application claims priority based on Japanese Patent Application No. 2018-42682 filed on Mar. 9, 2018, the entire disclosure of which is incorporated herein.

INDUSTRIAL APPLICABILITY

The present invention can be suitably applied to what detects a position of a moving body by using a satellite positioning system.

REFERENCE SIGNS LIST 1, 1A, 1B Moving body
2 Satellite
3 Electronic reference point
4 Map server
10 Position detection device
11 GNSS receiver
111 GNSS antenna
12 Positioning unit
121 Multipath detection unit
122 Invalidity determination condition assignment unit
123 Positioning calculation unit
13 External data acquisition unit
14 Camera device
15 Map data storage device
16 Other-party communication IF
17 Other-party communication antenna
20 External data system
10A, 10B, 10C, 10D Position detection device
101 Observation data reception unit
102 Positioning unit
103A Image data acquisition unit
103B Map data acquisition unit
103C Different-station observation data acquisition unit
104 Imaging unit
105 Map data storage unit 106 Communication unit
30 Communication network
40 Receiver station
1000 Computer
1001 CPU
1002 Main storage device
1003 Auxiliary storage device
1004 Interface
1005 Display device
1006 Input device
61 External data acquisition means
62 Multipath detection means
621 Invalidity determination condition assignment means
63 GNSS receiver
64 Positioning calculation means
65 External data analysis means

The invention claimed is:

1. A moving body positioning system comprising:
a GNSS receiver that is included in a moving body and that receives a GNSS signal transmitted from each of one or more satellites and acquires observation data corresponding to each of the satellites;
an external data acquisition unit that acquires external data that is predetermined data other than the observation data;
a multipath detection unit that detects multipath with respect to an observation data group that is a set of pieces of observation data used for positioning calculation to identify a position of the moving body and that is a set of pieces of observation data respectively acquired from the GNSS signals of the one or more satellites; and
a positioning calculation unit that performs the positioning calculation after selection of a satellite to be used and a satellite to be excluded on the basis of a result of the multipath detection, wherein
the multipath detection unit detects the multipath by determining whether the observation data is the multipath on the basis of a blocked range with respect to the GNSS signals in the moving body or an observation status of the GNSS signals in a different station that is a receiver station other than the moving body, the blocked range or the observation status being acquired from an analysis of the external data, and
wherein
the multipath detection unit includes
an invalidity determination condition assignment unit that assigns, to at least observation data included in the observation data group and determined to be the multipath, a predetermined index to be a determination condition for invalidity of the observation data.

2. The moving body positioning system according to claim 1, wherein
the external data is at least any one of image data photographed by a camera device included in the moving body, three-dimensional map data within a predetermined range around the moving body, and different-station observation data indicating the observation status of the GNSS signals in the different station.

3. The moving body positioning system according to claim 1, further comprising
an external data analysis unit that analyzes the external data and identifies the blocked range with respect to the GNSS signals in the moving body or the observation status of the GNSS signals in the different station that is the receiver station other than the moving body.

4. The moving body positioning system according to claim 2, wherein
the external data acquisition unit acquires at least image data acquired by photographing of a surrounding environment of the moving body with a camera device included in the moving body, and
the multipath detection unit detects the multipath by determining whether the observation data is the multipath on the basis of the blocked range identified on the basis of a position and a size of a ground surface object, which is captured in the image data and acquired by an analysis of the image data, and a position of the moving body.

5. The moving body positioning system according to claim 4, wherein
the external data acquisition unit acquires time-series image data photographed by the camera device included in the moving body.

6. The moving body positioning system according to claim 2, wherein
the external data acquisition unit acquires at least three-dimensional map data within a predetermined range around the moving body which range is identified by a latest position of the moving body, and
the multipath detection unit detects the multipath by determining whether the observation data is the multipath on the basis of the blocked range identified on the basis of a position and a size of a ground surface object existing around the moving body, which position and size are indicated by the three-dimensional map data and are acquired by an analysis of the three-dimensional map data, and the latest position of the moving body.

7. The moving body positioning system according to claim 2, wherein
the external data acquisition unit communicates with the different station and acquires the different-station observation data, and
the multipath detection unit detects the multipath by determining whether the observation data is the multipath on the basis of an error amount in an estimation distance between the moving body and a satellite that is a transmitter station of a GNSS signal which error amount is identified on the basis of an estimation distance between the different station and the satellite, which distance is acquired by an analysis of the different-station observation data, and a distance between the different station and the moving body.

8. The moving body positioning system according to claim 1, wherein
the external data acquisition unit acquires at least two or more kinds of external data among image data photographed by a camera device included in the moving body, three-dimensional map data within a predetermined range around the moving body, and different-station observation data indicating the observation status of the GNSS signals in the different station.

9. A moving body positioning method comprising:
acquiring observation data that is acquired from a GNSS signal transmitted from each of one or more satellites and received by a GNSS receiver included in a moving body and that is observation data corresponding to each of the satellites;
acquiring external data that is predetermined data other than the observation data;
detecting multipath, with respect to an observation data group that is a set of pieces of the observation data respectively corresponding to the satellites, by determining whether each piece of the observation data in the observation data group is the multipath on the basis of a blocked range with respect to the GNSS signals in the moving body or an observation status of the GNSS signals in a different station that is a receiver station other than the moving body, the blocked range or the observation status being acquired by an analysis of the external data; and performing positioning calculation after selection of a satellite to be used or a satellite to be excluded on the basis of a result of the multipath detection, acquiring observation data, acquiring external data, detecting the multipath, and performing position calculation being performed by an information processing device, wherein detecting the multipath comprises:

assigning, to at least observation data included in the observation data group and determined to be the multipath, a predetermined index to be a determination condition for invalidity of the observation data.

10. A non-transitory computer-readable recording medium in which a moving body positioning program is recorded, the moving body positioning program causing a computer to execute:

processing of acquiring observation data that is acquired from a GNSS signal transmitted from each of one or more satellites and received by a GNSS receiver included in a moving body and that is observation data corresponding to each of the satellites, processing of acquiring external data that is predetermined data other than the observation data, processing of detecting multipath, with respect to an observation data group that is a set of pieces of the observation data respectively corresponding to the satellites, by determining whether each piece of the observation data in the observation data group is the multipath on the basis of a blocked range with respect to the GNSS signals in the moving body or an observation status of the GNSS signals in a different station that is a receiver station other than the moving body, the blocked range or the observation status being acquired by an analysis of the external data, and processing of performing positioning calculation after selection of a satellite to be used and a satellite to be excluded on the basis of a result of the multipath detection, wherein, in the processing of detecting the multipath, the moving body positioning program causes the computer to execute:

assigning, to at least observation data included in the observation data group and determined to be the multipath, a predetermined index to be a determination condition for invalidity of the observation data.

* * * * *